US010962439B2

(12) United States Patent
Enev et al.

(10) Patent No.: US 10,962,439 B2
(45) Date of Patent: Mar. 30, 2021

(54) WATER LEAK DETECTION USING PRESSURE SENSING

(71) Applicant: Phyn LLC, Torrance, CA (US)

(72) Inventors: Miroslav Enev, Everett, WA (US); Salil Banerjee, Bellevue, WA (US); Shwetak N. Patel, Seattle, WA (US)

(73) Assignee: PHYN, LLC, Torrance, CA (US)

(*) Notice: Subject to any disclaimer, the term of this patent is extended or adjusted under 35 U.S.C. 154(b) by 0 days.

(21) Appl. No.: 16/508,166

(22) Filed: Jul. 10, 2019

(65) Prior Publication Data
US 2019/0331547 A1 Oct. 31, 2019

Related U.S. Application Data

(62) Division of application No. 14/937,831, filed on Nov. 10, 2015, now Pat. No. 10,352,814.

(51) Int. Cl.
G01M 3/28 (2006.01)
E03B 7/07 (2006.01)

(52) U.S. Cl.
CPC .............. *G01M 3/2815* (2013.01); *E03B 7/07* (2013.01); *E03B 7/071* (2013.01); *Y02A 20/15* (2018.01)

(58) Field of Classification Search
None
See application file for complete search history.

(56) References Cited

U.S. PATENT DOCUMENTS 2,991,481 A 7/1961 Book
4,133,373 A 1/1979 Slagley et al.
(Continued)

FOREIGN PATENT DOCUMENTS

CN 1809738 7/2006
CN 101160518 4/2008
(Continued)

OTHER PUBLICATIONS

Y. Ishido (A New Indicator for Real-Time Leak Detection in Water Distribution Networks: Design and Simulation Validation, 2014 The Authors. Published by Elsevier Ltd, page, Procedia Engineering 89 ( 2014) 411-417). (Year: 2014).*
(Continued)

*Primary Examiner* — Tung S Lau
(74) *Attorney, Agent, or Firm* — Bryan Cave Leighton Paisner LLP

(57) ABSTRACT

A method including measuring pressure of water in a water system of a structure at a single location in the water system using a pressure sensor of a sensing device to generate pressure measurement data representing the pressure of the water as measured by the pressure sensor. The method also can include communicating the pressure measurement data to one or more processors. The method additionally can include detecting a non-cyclical pressure event corresponding to a water leak in the water system of the structure during a first time period based on an analysis of information including the pressure measurement data. The information analyzed in the analysis does not include flow measurement data that represents a total amount of flow of the water in the water system of the structure during the first time period. Other embodiments are described.

20 Claims, 16 Drawing Sheets

(56) References Cited

U.S. PATENT DOCUMENTS

| | | |
|---|---|---|
| 4,804,957 A | 2/1989 | Selph et al. |
| 4,858,141 A | 8/1989 | Hart et al. |
| 5,004,014 A | 4/1991 | Bender |
| 5,409,037 A | 4/1995 | Wheeler et al. |
| 5,441,070 A | 8/1995 | Thompson |
| 5,483,838 A | 1/1996 | Holden |
| 5,535,253 A | 7/1996 | Loisy et al. |
| 5,568,825 A | 10/1996 | Faulk |
| 5,635,895 A | 6/1997 | Murr |
| 5,875,812 A | 3/1999 | Miller |
| 6,273,686 B1 | 8/2001 | Kroell et al. |
| 6,389,881 B1 | 5/2002 | Yang et al. |
| 6,568,416 B2 | 5/2003 | Tucker et al. |
| 6,587,797 B1 | 7/2003 | Kamada et al. |
| 6,728,646 B2 | 4/2004 | Howell et al. |
| 6,763,843 B1 | 7/2004 | Dickerson et al. |
| 6,839,644 B1 | 1/2005 | Woods et al. |
| 6,853,291 B1 | 2/2005 | Aisa |
| 6,860,288 B2 | 3/2005 | Uhler |
| 6,869,644 B2 | 3/2005 | Buhay et al. |
| 6,944,523 B2 | 9/2005 | Addink et al. |
| 6,963,808 B1 | 11/2005 | Addink et al. |
| 6,993,417 B2 | 1/2006 | Osann, Jr. |
| 7,043,380 B2 | 5/2006 | Rodenberg et al. |
| 7,049,976 B2 | 5/2006 | Hunt et al. |
| 7,174,771 B2 | 2/2007 | Cooper |
| 7,276,915 B1 | 10/2007 | Euler et al. |
| 7,306,008 B2 | 12/2007 | Tornay |
| 7,330,796 B2 | 2/2008 | Addink et al. |
| 7,400,986 B2 | 7/2008 | Latham et al. |
| 7,460,930 B1 | 12/2008 | Howell et al. |
| 7,493,221 B2 | 2/2009 | Caggiano et al. |
| 7,508,318 B2 | 3/2009 | Casella et al. |
| 7,541,941 B2 | 6/2009 | Bogolea et al. |
| 7,546,214 B2 | 6/2009 | Rivers, Jr. et al. |
| 7,574,896 B1 | 8/2009 | Cooper |
| 7,669,461 B2 | 3/2010 | Kates |
| 7,710,282 B1 | 5/2010 | Young |
| 7,711,454 B2 | 5/2010 | Addink |
| 7,719,257 B2 | 5/2010 | Robarge et al. |
| 8,078,413 B2 | 12/2011 | Levy |
| 8,106,769 B1 | 1/2012 | Maroney et al. |
| 8,436,738 B2 | 5/2013 | Bach et al. |
| 8,457,908 B2 | 6/2013 | Patel et al. |
| 8,667,978 B2 | 3/2014 | Ford |
| 8,720,481 B2 | 5/2014 | Guy |
| 8,751,174 B2 | 6/2014 | Koehler et al. |
| 9,109,548 B2 | 8/2015 | Dudar et al. |
| 9,250,105 B2 | 2/2016 | Patel et al. |
| 9,297,467 B1 | 3/2016 | Goseco |
| 9,939,299 B2 | 4/2018 | Patel et al. |
| 10,094,095 B2 * | 10/2018 | Enev ............... E03B 7/071 |
| 2001/0003286 A1 | 6/2001 | Philippbar et al. |
| 2002/0148515 A1 | 10/2002 | Coffey et al. |
| 2003/0088527 A1 | 5/2003 | Hung et al. |
| 2004/0093172 A1 | 5/2004 | Mizushina et al. |
| 2004/0128034 A1 | 7/2004 | Lenker et al. |
| 2004/0140908 A1 | 7/2004 | Gladwin et al. |
| 2004/0163705 A1 | 8/2004 | Uhler |
| 2004/0206405 A1 | 10/2004 | Smith et al. |
| 2005/0016593 A1 | 1/2005 | Ephrat et al. |
| 2005/0067049 A1 | 3/2005 | Fima et al. |
| 2005/0072214 A1 | 4/2005 | Cooper |
| 2005/0126635 A1 | 6/2005 | Addink et al. |
| 2005/0224118 A1 | 10/2005 | Tornay |
| 2005/0246112 A1 | 11/2005 | Abhulimen et al. |
| 2006/0260691 A1 | 11/2006 | Davidoff |
| 2007/0068225 A1 | 3/2007 | Brown |
| 2007/0289635 A1 | 12/2007 | Ghazarian et al. |
| 2008/0066812 A1 | 3/2008 | Tornay |
| 2008/0086394 A1 | 4/2008 | O'Neil et al. |
| 2008/0184781 A1 | 8/2008 | Mulligan et al. |
| 2008/0251131 A1 | 10/2008 | Ford |
| 2008/0255782 A1 | 10/2008 | Bilac |
| 2008/0295895 A1 | 12/2008 | Vincent et al. |
| 2009/0043427 A1 | 2/2009 | Addink |
| 2009/0072985 A1 | 3/2009 | Patel et al. |
| 2009/0235992 A1 | 9/2009 | Armstrong |
| 2010/0175461 A1 | 7/2010 | Brown |
| 2010/0212748 A1 * | 8/2010 | Davidoff ............... F17D 5/02 137/10 |
| 2010/0241367 A1 | 9/2010 | Yada et al. |
| 2010/0258204 A1 | 10/2010 | Cipolla |
| 2010/0313958 A1 | 12/2010 | Patel et al. |
| 2011/0106466 A1 | 5/2011 | Furmanski et al. |
| 2011/0114202 A1 | 5/2011 | Goseco |
| 2011/0178644 A1 | 7/2011 | Picton |
| 2012/0180877 A1 | 7/2012 | Pallais |
| 2012/0273069 A1 | 11/2012 | Klicpera et al. |
| 2012/0291886 A1 | 11/2012 | Rivera |
| 2013/0214936 A1 * | 8/2013 | Schuberth ............ G01M 3/243 340/870.03 |
| 2014/0026644 A1 | 1/2014 | Patel et al. |
| 2014/0121999 A1 | 5/2014 | Bracken et al. |
| 2014/0165731 A1 | 6/2014 | Linford |
| 2016/0146648 A1 | 5/2016 | Patel et al. |
| 2016/0289929 A1 | 10/2016 | Guy et al. |
| 2017/0131174 A1 * | 5/2017 | Enev ............... E03B 7/071 |
| 2017/0205309 A1 | 7/2017 | Franklin |
| 2017/0307466 A1 * | 10/2017 | Brennan, Jr. ....... G01M 3/2807 |
| 2018/0045377 A1 | 2/2018 | Albertao et al. |
| 2018/0127957 A1 * | 5/2018 | Enev ............... E03B 7/071 |
| 2018/0333556 A1 * | 11/2018 | Ormrod ............ A61M 16/0066 |

FOREIGN PATENT DOCUMENTS

| | | | |
|---|---|---|---|
| CN | 102235575 | * 11/2011 | ............ G06F 17/18 |
| CN | 103423597 | * 12/2013 | ............... F17D 5/02 |
| CN | 103887543 | * 1/2014 | ........ H01M 8/04373 |
| CN | 10388754 | * 6/2014 | ........ H01M 8/04373 |
| CN | 104879168 | * 9/2015 | ............ E21F 17/18 |
| CN | 205837693 | * 12/2016 | ............ B65D 90/50 |
| CN | 205865785 | * 1/2017 | ............... A21B 7/00 |
| CN | 108700486 | * 10/2018 | ............ E03B 7/071 |
| DE | 102007032053 | 1/2009 | |
| DE | 102009045150 | 6/2011 | |
| EP | 1024352 | 8/2000 | |
| GB | 2228335 | 8/1990 | |
| JP | 01-098940 | 4/1989 | |
| JP | 08338784 | 12/1996 | |
| JP | 3461973 | 10/2003 | |
| JP | 2005114583 | 4/2005 | |
| JP | 2005337932 | 12/2005 | |
| SG | 193083 | 9/2013 | |
| TW | 1352886 | 11/2011 | |
| WO | 2005095916 | 10/2005 | |
| WO | 2006036513 | 4/2006 | |
| WO | 2008128127 | 10/2008 | |
| WO | 2010007369 | 1/2010 | |
| WO | 2010144100 | 12/2010 | |
| WO | 2017083547 | 5/2017 | |

OTHER PUBLICATIONS

M.M. Gamboa-Medina (Feature extraction in pressure signals for leak detection in water Networks, 2013, p. 688-697 (Year: 2013).*

John Mashford,, An approach to leak detection in pipe networks using analysis of monitored pressure valves by support vector machine, 7 pages (Year: 2009).*

C.M. Giorgio Bort, Methodology for Leakage Isolation Using Pressure Sensitivity and Correlation Analysis in Water Distribution Systems, 8 pages (Year: 2014).*

Shinozuka et al., Use of Supervisory Control and Data Acquisition for Damage Location of Water Delivery Systems, Journal of Engineering Mechanics ASCE, Mar. 1, 2005, 131(3):225¬230, (Jan. 3, 2005) DOI: 10.1061/(ASCE)0733-9399 (2005)131(3):225-230.

Ueno et al., "Effectiveness of Displaying Energy Consumption Data in Residential Houses—Analysis on how the Residents Respond," ECEEE 2005 Summer Study—What Works and Who Delivers?: 1289-1299, 2005.

(56) References Cited

OTHER PUBLICATIONS

Alan T. Gardner, "A Differential Pressure Instrument with Wireless Telemetry for In-Situ Measurement of Fluid Flow across Sediment-Water Boundaries," Sensors 2009, Published: Jan. 9, 2009, pp. 404-429.
R. Sarrate, "Sensor placement for leak detection and location in water distribution networks," Oct. 22-25, 2013, 10 pages.
Gonzalo Pajares Martinsanz, "Sensors for Fluid Leak Detection," Feb. 5, 2015, 4 pages.
Pall Magnus Kornmayer, "Pressure Difference-Based Sensing of Leaks in Water Distribution Networks," Jun. 2011, 35 pages.
International Search Report and Written Opinion for PCT/US2017/059894, dated Feb. 13, 2018, 16 pages.
Giurco et al., "Innovative Smart Metering Technology and its Role in End-Use Measurement," Water Efficiency 2008, Gold Coast, Mar. 31-Apr. 2, 2008.
Ao et al., "Ultrasonic Clamp-On Flow Measurement of Natural Gas, Steam, and Compressed Air," 9 pp., 2009. http://www.gesensing.com/products/resources/whitepapers/ur268.pdf.
Arregui et al., "Evaluating Domestic Water Meter Accuracy: A Case Study," 343-352, 2003.
Arroyo et al., "Waterbot: Exploring Feedback and Persuasive Techniques at the Sink," CHI 2005—Papers: Technology in the Home: 631-639, 2005.
Arvola et al., "Billing Feedback as a Means to Encourage Household Electricity Conservation: A Field Experiment in Helsinki," Proceedings of the1993 Summer Study of the European Council for Energy Efficient Economy: 11-21, 2003.
Balash et al., "Natural Gas and Electricity Costs and Impacts on Industry," National Energy Technology Laboratory: 17 pp., 2008.
Bac et al., "Activity Recognition from User-Annotated Acceleration Data," Pervasive: 1-17, 2004.
Beckmann et al., "Some Assembly Required: Supporting End-User Sensor Installation in Domestic Ubiquitous Computing Environments," UbiComp 2004: 107-124, 2004.
Brandon et al., "Reducing Household Energy Consumption: A Qualitative and Quantitative Field Study," Journal of Environmental Psychology: 75-85, 1999.
Brumitt et al., "EasyLiving: Technologies for Intelligent Environments," Proceedings of the International Symposium on Handheld and Ubiquitous Computing: 12-29, 2000.
Darby, Sarah, "Making it Obvious: Designing Feedback into Energy Consumption," Proceedings of the Second International Conference on Energy Efficiency in Household Appliances and Lighting: 11 pp., 2000.
Darby, Sarah, "The Effectiveness of Feedback on Energy Consumption: A Review for DEFRA on the Literature on Metering, Billing and Direct Displays," Environmental Change Institute: 21 pp., 2006.
N.a., "End-User-Deployable Whole House Contact-Less Power Consumption Sensing," UbiComp 2009:4 pp., 2009.
Evans et al., "Flow Rate Measurements Using Flow-Induced Pipe Vibration," Journal of Fluids Engineering, vol. 126, No. 2: 280-285, 2004.
Fischer, Corinna, "Feedback on Household Electricity Consumption: A Tool for Saving Energy?" Energy Efficiency: 79-104, 2008.
Fogarty, James et al. "Sensing from the Basement: A Feasiblity Study of Unobtrusive and Low-Cost Home Activity Recognition," UIST'06, Switzerland, Oct. 15-18, 2006.
Froehlich et al., "HydroSense: Infrastructure-Mediated Single-Point Sensing of Whole-home Water Activity," Ubicomp 2009: 235-244, 2009.
Froehlich et al., "Sensing Opportunities for Personalized Feedback Technology to Reduce Consumption," UW CSE Technical Report: CSE 09-13-01: 7 pp., 2009.
Froehlich et al., "The Design of Eco-Feedback Technology," CHI 2010: 10 pp., 2010.
Froehlich, Jon, "Sensing and Feedback of Everyday Activities to Promote Environmentally Sustainable Behaviors," Thesis Proposal, Computer Science and Engineering, University of Washington: 35 pp., 2009.
Hirsch et al., "The ELDer Project: Social, Emotional, and Environmental Factors in the Design of Eldercare Technologies," Conference on Universal Usability 2000: 72-79, 2000.
Horst, Gale, "Whirlpool Corporation: Woodridge Energy Study and Monitoring Pilot," 1-99, 2006.
Kempton et al., "The Consumer's Energy Analysis Environment," Energy Policy, vol. 22, No. 10: 857-866, 1994.
Kim et al., "ViridiScope: Design and Implementation of a Fine Grained Power Monitoring System for Homes," UbiComp 2009: 245-254, 2009.
Kim et al., "NAWMS: Nonintrusive Autonomous Water Monitoring System," SensSys '08 309-321, Nov. 5-7, 2008.
Koile et al., "Activity Zones for Context-Aware Computing," UbiComp 2003: 90-106, 2003.
Lester et al., "A Hybrid Discriminative/Generative Approach for Modeling Human Activities," International Join Conference on Artificial Intelligence: 766-772, 2005.
Lowenstein et al., "Disaggregating Residential Hot Water Use," American Society of Heating, Refrigerating, and Air-Conditioning Engineers (ASHRAE) Transactions: Symposia 1019-1027, 1996.
Mountain, Dean, "Price Influences Demand," DeGroote School of Business, McMaster University: 16 pp., 2008.
Chetty et al., "How Smart Homes Learn: The Evolution of the Networked Home and Household," UbiComp 2007: 127-144, 2007.
Oppenheim et al., "From Frequency to Quefrency: A History of the Cepstrum," IEEE Signal Processing Magazine, vol. 21, No. 5: 95-106, 2004.
Orr et al., "The Smart Floor: A Mechanism for Natural User Identification and Tracking," CHI 2000: 275-276, 2000.
Patel et al., "PowerLine Positioning: A Practical Sub-Room-Level Indoor Location System for Domestic Use," UbiComp 2006: 441-458, 2006.
Mayer, Peter, "Residential Water Use and Conservation Effectiveness: A Process Approach," University of Colorado & Department of Civil, Environmental, and Architectural Engineering 153pp., 1995.
Parker et al., "Contract Report: Pilot Evaluation of Energy Savings from Residential Energy Demand Feedback Devices," Florida Solar Energy Center, A Research Insitute of the University of Central Florida: 32 pp., 2008.
Patel et al., "At the Flick of a Switch: Detecting and Classifying Unique Electrial Events on the Residential Power Line," UbiComp 2007: 271-288, 2007.
Patel, Shwetak, "Bringing Sensing to the Masses: An Exploration in Infrastructure-Mediated Sensing," Intel Labs: 133 pp., 2008.
Philipose et al., "Inferring Activities from Interactions with Objects," PERVASIVEcomputing, vol. 3, No. 4: 50-57, 2004.
Rowan et al., "Digital Family Portrait Field Trial: Support for Aging in Place," CHI 2005: 512-530, 2005.
N.a., "Study Finds Elder Care a Growing Emotional and Financial Burden for Baby Boomers—New ADT Monitoring Service for Elderly Helps Ease the Stress of Long Distance Care Giving," PR Newswire: 4 pp., 2005.
N.a., "Summary: The Impact of Real-Time Feedback on Residential Electricity Consumption: The Hydro One Pilot," 4 pp., 2006.
Tapia et al., "Activity Recognition in the Home Setting Using Simple and Ubiquitous Sensors." Pervasive, LNCS 3001: 158-175, 2004.
Tapia et al., "The Design of a Portable Kit of Wireless Sensors for Naturalistic Data Collection," Pervasive: 117-134, 2006.
N.a., "The Value of Disaggregated Feedback," 1 pg., no date available.
Wilson et al., "Simultaneous Tracking & Activity Recognition (STAR) Using Many Anonymous Binary Sensors," Pervasive: 62-79, 2005.
Wren et al., "Toward Scalable Activity Recognition for Sensor Networks," LoCA: 168-185, 2006.

(56) References Cited

OTHER PUBLICATIONS

Yang et al., "Visual Integration from Mulitple Cameras," Proceedings of the Seventh IEEE Workshop on Applications Computer Vision: 488-493, 2005.

International search report and written opinion dated Apr. 1, 2010 for PCT/US2009/053848.

Chen et al., "Bathroom Activity Monitoring Based on Sound," Pervasive, LNCS 3468: 47-61, 2005.

International Search Report and Written Opinion dated Feb. 16, 2017 for International Application No. PCT/US2016/061370.

* cited by examiner

WATER LEAK DETECTION USING PRESSURE SENSING

CROSS-REFERENCE TO RELATED APPLICATIONS

This application is a divisional of U.S. patent application Ser. No. 14/937,831, filed Nov. 10, 2015. U.S. patent application Ser. No. 14/937,831 is incorporated herein by reference in its entirety.

TECHNICAL FIELD

This disclosure relates generally to detecting leaks in a pressurized system, and relates more particularly to detection of non-cyclical leaks using pressure sensing.

BACKGROUND

Pressurized systems supply various types of materials to venues. For example, water-supply systems deliver potable water to buildings or venues, such as residential homes and commercial installations. The water can be delivered along industrial strength pipes at significant pressure using a system of high-pressure pumps. At the interface between the utility and the target building or venue, a pressure regulator can be installed to ensure that utility-supplied water pressure is reduced to desirable levels for appliances and/or human activity. The pressure of the water within the building or venue varies as water is used or as leaks occur in the plumbing or fixtures of the building or venue. In another example, gas-supply systems deliver pressurized gas to buildings or venues for gas-powered items. Leaks can also occur in gas supply lines within the venue. Other pressurized systems also exist. Leaks in supply lines can lead to loss of water, gas, or other substances and also can reduce pressure.

BRIEF DESCRIPTION OF THE DRAWINGS

To facilitate further description of the embodiments, the following drawings are provided in which.

Figure 1:
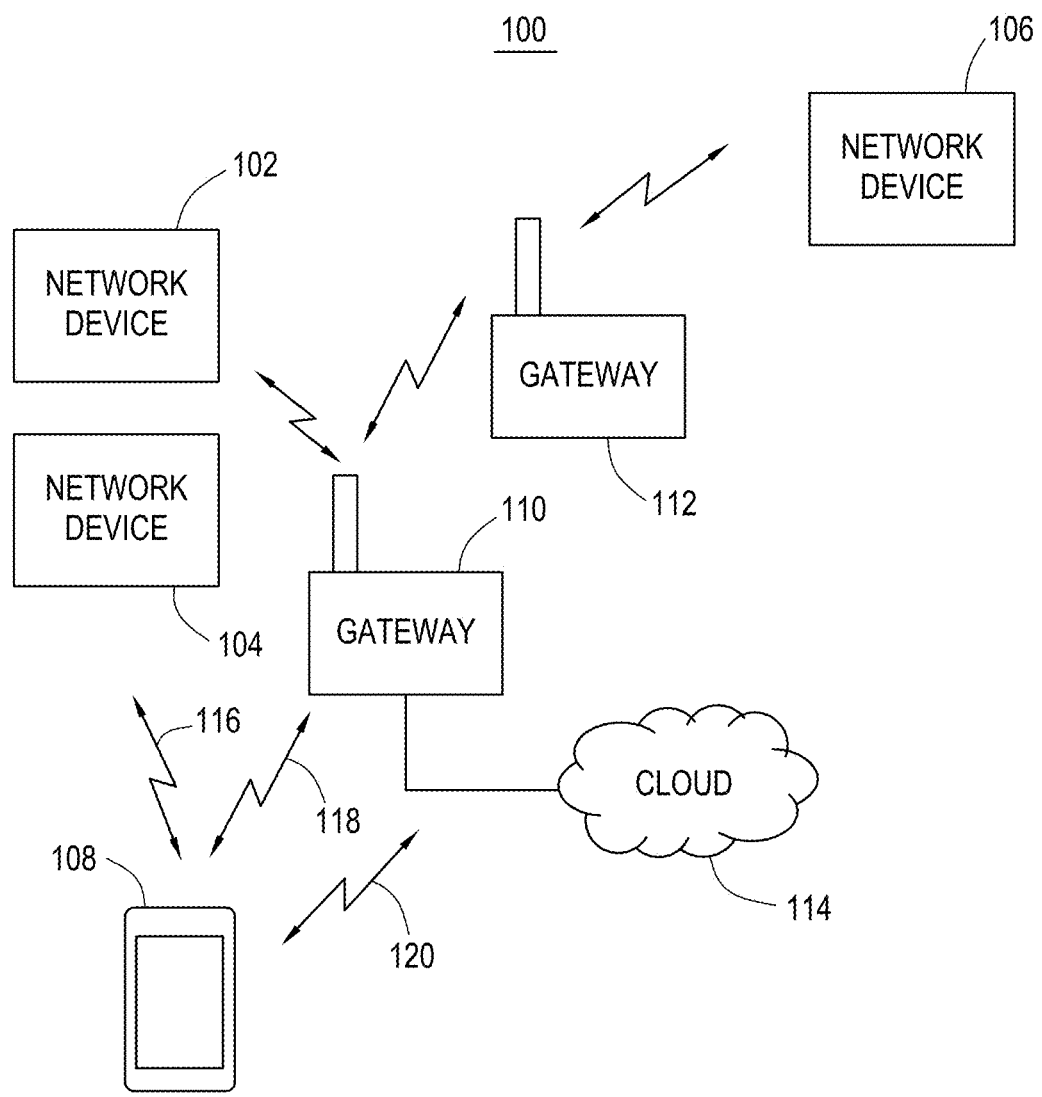
FIG. 1 illustrates an example of a local area network 100.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a system including a sensing device including a pressure sensor configured to measure pressure of water in a water system of a structure. The sensing device can be configured to generate pressure measurement data representing the pressure of the water as measured by the pressure sensor. The system also can include one or more processing units including one or more processors and one or more non-transitory storage media storing machine executable instructions configured when run on the one or more processors to perform detecting a non-cyclical pressure event corresponding to a water leak in the water system of the structure during a first time period based on an analysis of information including the pressure measurement data. The information analyzed in the analysis does not include any flow measurement data that represents a total amount of flow of the water in the water system of the structure during the first time period. The pressure sensor can be coupled to the water system of the structure at a single location of the water system of the structure when measuring the pressure of the water in the water system of the structure.

A number of embodiments include a method including measuring pressure of water in a water system of a structure at a single location in the water system using a pressure sensor of a sensing device to generate pressure measurement data representing the pressure of the water as measured by the pressure sensor. The method also can include communicating the pressure measurement data to one or more processing units. The method additionally can include detecting a non-cyclical pressure event corresponding to a water leak in the water system of the structure during a first time period based on an analysis of information including the pressure measurement data. The information analyzed in the analysis does not include flow measurement data that represents a total amount of flow of the water in the water system of the structure during the first time period.

Techniques and systems are described for detecting leaks in a pressurized system using pressure data. For example, the pressurized system can include a home water system in a building or venue that is supplied with water from a water-supply system. A leak detection device with a pressure sensor can be coupled to the home water system. The leak detection device can be a network device with network connectivity, as explained further below. In some examples, the leak detection device can include a flow sensor. The pressure sensor can monitor pressure within the pressurized system, and can generate pressure data that represents the pressure. The leak detection device can analyze the pressure data to identify leaks in the pressurized system. For example, based on the analysis of the pressure data, the leak detection device may identify an occurrence of a leak and/or a type of leak that has occurred. The pressure data can be analyzed in the frequency domain, in the time domain, or in both the frequency and time domains to identify different types of leaks. The leak detection device can communicate with a cloud computing system for reporting information regarding leaks, requesting verification of a leak, or for exchanging other communications. A leak detection device can be used for detecting leaks in other types of pressurized systems, such as natural gas systems.

In some embodiments, a cloud computing system may be provided for communicating with one or more leak detection devices. The cloud computing system can analyze pressure data provided from a leak detection device, and can determine or verify occurrences of leaks and types of leaks. In some examples, the cloud computing system can determine a type of leak that has occurred based on detection of multiple time and/or frequency domain characteristics from the pressure data. For example, the cloud computing system can map one or more detected time and/or frequency domain characteristics to a type of leak.

The leak detection device and/or the cloud computing system can provide information to a graphical interface of a user device. The graphical interface can include a web interface or a mobile device interface. The graphical interface provides notification and interaction functions for a user of the user device. For example, the graphical interface can communicate or present leak information for the user, and can allow the user to provide input to enable and disable various fixtures in the pressurized system, or to enable or disable various settings (e.g., types of notifications such as reporting alerts, frequency of notifications, types of leaks to report, or any other suitable setting).

A network may be set up to provide a user of an access device with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment or a venue can include, for example, a home, an office, a business, an automobile, a park, an industrial or commercial plant, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network can include multiple network devices that provide various functionalities. Network devices may be accessed and controlled using an access device and/or one or more network gateways. Examples of network devices include a leak detection device, an automation device that allows remote configuration or control of one or more electronic devices connected to the home automation device, a motion sensing device, or other suitable network-connected device. One or more gateways in the local area network may be designated as a primary gateway that provides the local area network with access to an external network. The local area network can also extend outside of a venue and may include network devices located outside of the venue. For instance, the local area network can include network devices such as exterior motion sensors, exterior lighting (e.g., porch lights, walkway lights, security lights, or the like), garage door openers, sprinkler systems, or other network devices that are exterior to the venue. It is desirable for a user to be able to access the network devices while located within the local area network and also while located remotely from the local area network. For example, a user may access the network devices using an access device within the local area network or remotely from the local area network.

A network device within the local area network may pair with or connect to a gateway, and may obtain credentials from the gateway. For example, when the network device is powered on, a list of gateways that are detected by the network device may be displayed on an access device (e.g., via an application, program, or the like installed on and executed by the access device). In some embodiments, only a single gateway is included in the local area network (e.g., any other displayed gateways may be part of other local area networks). For example, the single gateway may include a router. In such embodiments, only the single gateway may be displayed (e.g., when only the single gateway is detected by the network device). In some embodiments, multiple gateways may be located in the local area network (e.g., a router, a range extending device, or the like), and may be displayed. For example, a router and a range extender (or multiple range extenders) may be part of the local area network. A user may select one of the gateways as the gateway with which the network device is to pair, and may enter login information for accessing the gateway. The login information may be the same information that was originally set up for accessing the gateway (e.g., a network user name and password, a network security key, or any other appropriate login information). The access device may send the login information to the network device, and the network device may use the login information to pair with the gateway. The network device may then obtain the credentials from the gateway. The credentials may include a service set identification (SSID) of the local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The server may register the gateway as a logical network, and may assign the first logical network a network identifier (ID). The server may further generate a set of security keys, which may include one or more security keys. For example, the server may generate a unique key for the network device and a separate unique key for the access device. The server may associate the network device and the access device with the logical network by storing the network ID and the set of security keys in a record or profile. The server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Each network device and access device may also be assigned a unique identifier (e.g., a universally unique identifier (UUID), a unique device identifier (UDID), globally unique identifier (GUID), or the like) by the cloud server that is separate from the network ID and the unique security key of each device. Accordingly, the access device may perform accountless authentication to allow the user to remotely access the network device via the cloud network without logging in each time access is requested. Further details relating to an accountless authentication process are described below. Also, the network device can communicate with the server regarding the logical network.

FIG. 1 illustrates an example of a local area network 100. Local area network 100 is merely exemplary and is not limited to the embodiments presented herein. The local area network can be employed in many different embodiments or examples not specifically depicted or described herein. In some embodiments, the local area network 100 can include a network device 102, a network device 104, and a network device 106. In some embodiments, any of network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. Network devices 102, 104, and 106, as IoT devices or other devices, may include leak detection devices, automation network devices, motion sensors, or other suitable device. Automation network devices, for example, allow a user to access, control, and/or configure various appliances, devices, or tools located within an environment or venue (e.g., a television, radio, light, fan, humidifier, sensor, microwave, iron, a tool, a manufacturing device, a printer, a computer, and/or the like), or outside of the venue (e.g., exterior motion sensors, exterior lighting, garage door openers, sprinkler systems, or the like). For example, network device 102 may include a home automation switch that may be coupled with a home appliance.

In some embodiments, network devices 102, 104, and 106 may be used in various environments or venues, such as a business, a school, an establishment, a park, an industrial or commercial plant, or any place that can support local area network 100 to enable communication with network devices 102, 104, and 106. For example, a network device can allow a user to access, control, and/or configure devices, such as appliances (e.g., a refrigerator, a microwave, a sink, or other suitable appliance), office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or other suitable devices.

A user can communicate with network devices 102, 104, and 106 using an access device 108. Access device 108 can include any human-to-machine interface with network connection capability that allows access to a network. For example, in some embodiments, access device 108 can include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, access device 108 can include a cellular or other broadband network transceiver radio or interface, and can be configured to communicate with a cellular or other broadband network using the cellular or broadband network transceiver radio. In some embodiments, access device 108 may not include a cellular network transceiver radio or interface. While only a single access device 108 is shown in FIG. 1, one of ordinary skill in the art will appreciate that multiple access devices may communicate with network devices 102, 104, and 106. The user may interact with the network devices 102, 104, and/or 106 using an application, a web browser, a proprietary program, or any other program executed and operated by access device 108. In some embodiments, access device 108 can communicate directly with network devices 102, 104, and/or 106 (e.g., through a communication signal 116). For example, the access device 108 can communicate directly with network device 102, 104, and/or 106 using Zigbee™ signals, Bluetooth™ signals, WiFi™ signals, infrared (IR) signals, UWB signals, WiFi-Direct signals, BLE (Bluetooth Low Energy) signals, sound frequency signals, or the like. In some embodiments, access device 108 can communicate with the network devices 102, 104, and/or 106 via the gateways 110, 112 (e.g., through a communication signal 118) and/or via a cloud network 114 (e.g., through a communication signal 120).

In some embodiments, local area network 100 can include a wireless network, a wired network, or a combination of a wired and wireless network. A wireless network may include any wireless interface or combination of wireless interfaces (e.g., Zigbee™, Bluetooth™, WiFi™, IR (infrared), UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in local area network 100. For example, local area network 100 can include gateway 110 and/or gateway 112. Gateway 110 and/or 112 can provide communication capabilities to network devices 102, 104, 106 and/or access device 108 via radio signals in order to provide communication, location, and/or other services to the devices. In some embodiments, gateway 110 can be directly connected to external network 114 and can provide other gateways and devices in the local area network with access to external network 114. Gateway 110 can be designated as a primary gateway. While two gateways 110 and 112 are shown in FIG. 1, one of ordinary skill in the art will appreciate that any number of gateways may be present within local area network 100.

The network access provided by gateway 110 and/or gateway 112 can be of any type of network familiar to those skilled in the art that can support data communications using any of a variety of commercially-available protocols. For example, gateways 110 and/or 112 can provide wireless communication capabilities for local area network 100 using particular communications protocols, such as WiFi™ (e.g., IEEE 802.11 family standards, or other wireless communication technologies, or any combination thereof). Using the communications protocol(s), gateways 110 and/or 112 can provide radio frequencies on which wireless enabled devices in local area network 100 can communicate. A gateway may also be referred to as a base station, an access point, Node B, Evolved Node B (eNodeB), access point base station, a Femtocell, home base station, home Node B, home eNodeB, or the like.

In many embodiments, gateways 110 and/or 112 can include a router, a modem, a range extending device, and/or any other device that provides network access among one or more computing devices and/or external networks. For example, gateway 110 can include a router or access point, and gateway 112 can include a range extending device. Examples of range extending devices can include a wireless range extender, a wireless repeater, or the like.

In several embodiments, a router gateway can include access point and router functionality, and in a number of embodiments can further include an Ethernet switch and/or a modem. For example, a router gateway can receive and forward data packets among different networks. When a data packet is received, the router gateway can read identification information (e.g., a media access control (MAC) address) in the packet to determine the intended destination for the packet. The router gateway can then access information in a routing table or routing policy, and can direct the packet to the next network or device in the transmission path of the packet. The data packet can be forwarded from one gateway to another through the computer networks until the packet is received at the intended destination.

In a number of embodiments, a range extending gateway can be used to improve signal range and strength within a local area network. The range extending gateway can receive an existing signal from a router gateway or other gateway and can rebroadcast the signal to create an additional logical network. For example, a range extending gateway can extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway can be able to connect through the repeated network provided by the range extending gateway. The router gateway and range extending gateway can exchange information about destination addresses using a dynamic routing protocol.

In various embodiments, network devices 102, 104, 106, and/or access device 108 can transmit and receive signals using one or more channels of various frequency bands provided by gateways 110 and/or 112. One of ordinary skill in the art will appreciate that any available frequency band, including those that are currently in use or that may become available at a future date, may be used to transmit and receive communications according to embodiments described herein. In some examples, network devices 102, 104, 106, access device 108, and/or gateways 110, 112 may exchange communications using channels of different WiFi™ frequency bands. For example, different channels available on a 2.4 gigahertz (GHz) WiFi™ frequency band that spans from 2.412 GHz to 2.484 GHz may be used. As another example, different channels available on a 5 GHz WiFi frequency band that spans from 4.915 GHz to 5.825 GHz may be used. Other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), or the like. Yet other examples of frequency bands that may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra-high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz).

Some or all of the channels can be available for use in a network. For example, channels 1-11 of the 2.4 GHz frequency may be available for use in a local area network. As another example, channels 36, 40, 44, 48, 52, 56, 60, 64, 100, 104, 108, 112, 116, 132, 136, 140, 149, 153, 157, and 161 of the 5 GHz frequency band may be available for use in a local area network. One of ordinary skill in the art will appreciate that any combination of the channels available on any of the frequency bands may be available for use in a network. The channels that are available for use may be regulated by the country in which the network is located.

In some embodiments, gateways 110 and/or 112 can provide access device 108 and/or network devices 102, 104, 106 with access to one or more external networks, such as cloud network 114, the Internet, and/or other wide area networks. In some embodiments, network devices 102, 104, 106 may connect directly to cloud network 114, for example, using broadband network access such as a cellular network. Cloud network 114 can include one or more cloud infrastructure systems that provide cloud services. A cloud infrastructure system may be operated by a service provider. In certain embodiments, services provided by cloud network 114 may include a host of services that are made available to users of the cloud infrastructure system on demand, such as registration and access control of network devices 102, 104, 106. Services provided by the cloud infrastructure system can dynamically scale to meet the needs of its users. Cloud network 114 can comprise one or more computers, servers, and/or systems. In some embodiments, the computers, servers, and/or systems that make up cloud network 114 are different from the user's own on-premises computers, servers, and/or systems. For example, cloud network 114 can host an application, and a user may, via a communication network such as the Internet, on demand, order and use the application.

In some embodiments, cloud network 114 can host a Network Address Translation (NAT) Traversal application in order to establish a secure connection between a service provider of the cloud network 114 and one or more of the network devices 102, 104, 106 and/or the access device 108. A separate secure connection may be established by each network device 102, 104, 106 for communicating between each network device 102, 104, 106 and cloud network 114. A secure connection may also be established by access device 108 for exchanging communications with cloud network 114. In some examples, the secure connection may include a secure Transmission Control Protocol (TCP) connection. Gateway 110 can provide NAT services for mapping ports and private IP addresses of network devices 102, 104, 106 and access device 108 to one or more public IP addresses and/or ports. Gateway 110 can provide the public IP addresses to cloud network 114. Cloud network 114 servers can direct communications that are destined for network devices 102, 104, 106 and access device 108 to the public IP addresses. In some embodiments, each secure connection may be kept open for an indefinite period of time so that cloud network 114 can initiate communications with each respective network device 102, 104, 106 or access device 108 at any time. Various protocols may be used to establish a secure, indefinite connection between each of network device 102, 104, and 106, access device 108, and the cloud network 114. Protocols may include Session Traversal Utilities for NAT (STUN), Traversal Using Relay NAT (TURN), Interactive Connectivity Establishment (ICE), a combination thereof, or any other appropriate NAT traversal protocol. Using these protocols, pinholes can be created in the NAT of gateway 110 that allow communications to pass from cloud network 114 to network devices 102, 104, 106 and access device 108.

In some cases, communications between cloud network 114 and network devices 102, 104, 106 and/or access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by cloud network 114 may be conducted over the TCP connection, and communications initiated by a network device may be conducted over a HTTP or HTTPS connection. In certain embodiments, cloud network 114 can include a suite of applications, middleware, and database service offerings that are delivered to a customer in a self-service, subscription-based, elastically scalable, reliable, highly available, and secure manner.

It should be appreciated that local area network 100 can have other components than those depicted. Further, the embodiment shown in the figure is only one example of a local area network that may incorporate an embodiment of the disclosure. In some other embodiments, local area network 100 can have more or fewer components than shown in the figure, may combine two or more components, or may have a different configuration or arrangement of components. Upon being powered on or reset, network devices (e.g., 102, 104, 106) can be registered with an external network (e.g., cloud network 114) and associated with a logical network within local area network 100.

As previously noted, techniques and systems are described herein for detecting leaks in a pressurized system using pressure data. A leak detection device can be coupled or attached to a component of the pressurized system in order to monitor pressure in the system and to generate pressure data representing the sensed pressure. The pressure data can be analyzed by the leak detection device and/or a cloud computing system to detect leaks. The leak detection device can include a network device, such as one of network devices 102, 104, or 106 shown in FIG. 1 and described above. Examples of pressurized systems in which leaks can be detected include a home water system in a venue that is supplied with water from a water-supply system, a home gas system in a venue that is supplied with gas from a gas-supply system, or any other pressurized system in which pressure of a substance in the system can be monitored.

Figure 2:
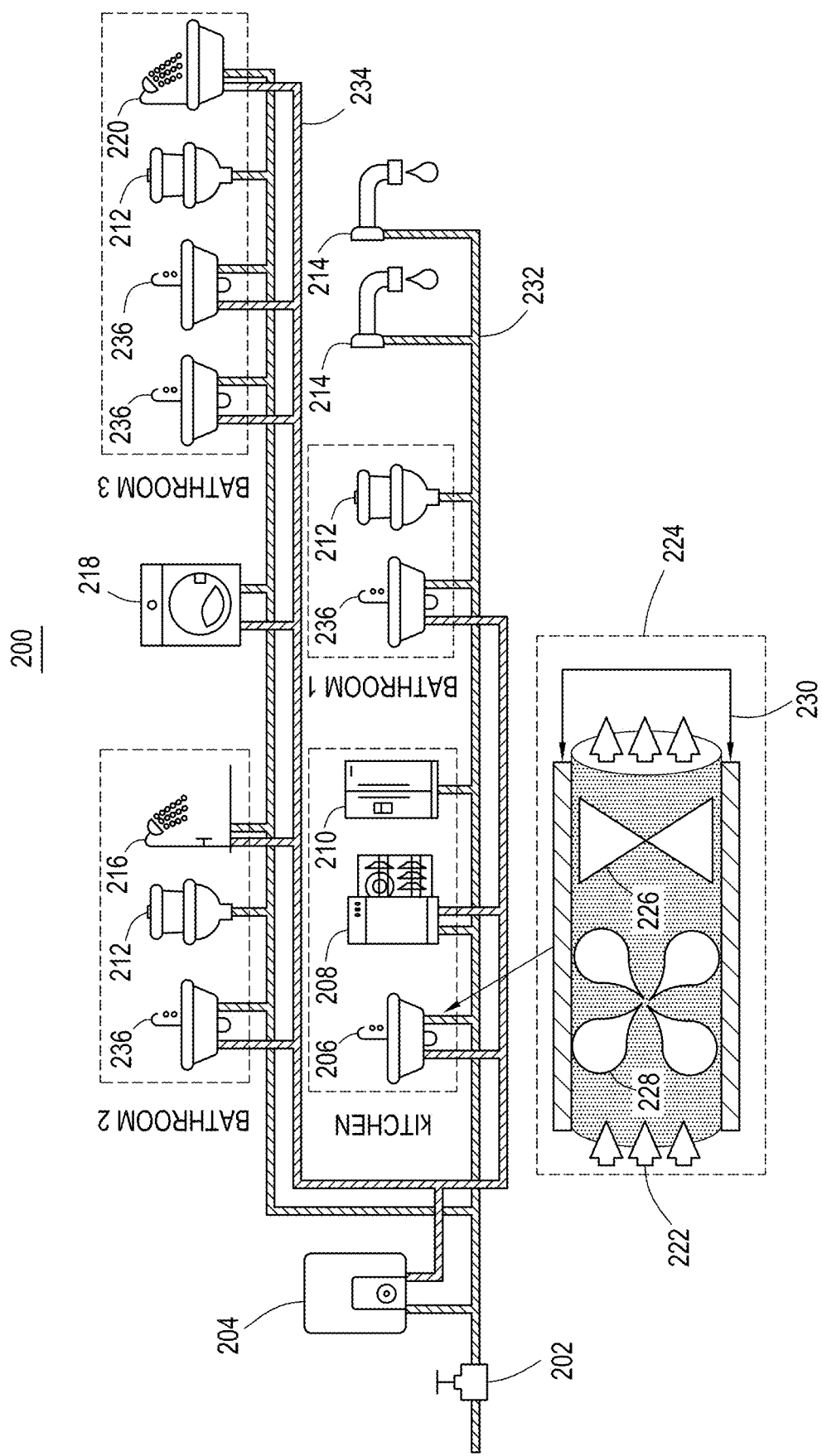
FIG. 2 illustrates a system diagram of an exemplary water system.

Turning ahead in the drawings, FIG. 2 illustrates a system diagram of an exemplary water system 200. Water system 200 is merely exemplary and is not limited to the embodiments presented herein. The water system can be employed in many different embodiments or examples not specifically depicted or described herein. In some examples, water system 200 can be part of a home water system. In other examples, water system 200 can be part of a water system of another venue, such as a commercial building, an outdoor commercial establishment (e.g., a mall, a park, or other commercial establishment), or any other venue in which a pressurized water system may exist.

In a number of embodiments, water can be supplied to water system 200 from a water-supply utility system that delivers potable water to venues along industrial strength pipes at high pressure using a system of high-pressure pumps. A pressure regulator 202 can be installed at the interface between the utility system and the water system 200. Pressure regulator 202 can convert the utility supplied pressure of the water (e.g., approximately 100-150 pounds per square inch (PSI)) down to pressure levels that are suitable for water system 200 in a home (e.g., approximately 20-80 PSI), such as to ensure safety and longevity of fixtures, pipes, and/or appliances in water system 200.

In several embodiments, water system 200 can include cold water lines 232 and hot water lines 234 that supply cold and hot water respectively to various fixtures in water system 200. In some embodiments, only cold water is supplied from the utility system, and a water heater 204 heats the cold water to provide hot water to the fixtures in water system 200. In some examples, water heater 204 can include a tank-type water heater with a reservoir of water that is heated. In other examples, water heater 204 can include a tankless water heater that does not include a reservoir. The tankless water heater may use a heat exchanger to heat water as it flows through the heater. Any commercially available tank-type or tankless water heater may be used. The fixtures can include a kitchen faucet 206, a dishwasher 208, and a refrigerator 210 in a kitchen; faucets 236 and toilets 212 in a first, a second, and a third bathroom, a shower 216 in the second bathroom, a shower tub 220 in the third bathroom, outdoor water taps 214, and a washing machine 218. As used herein, "fixtures" can refer to appliances, faucets, or other pieces of equipment that is attached to water system 200, which can make use of the water delivered by water system 200. In many embodiments, pressure regulator 202 is not considered a fixture in water system 200.

Figure 6:
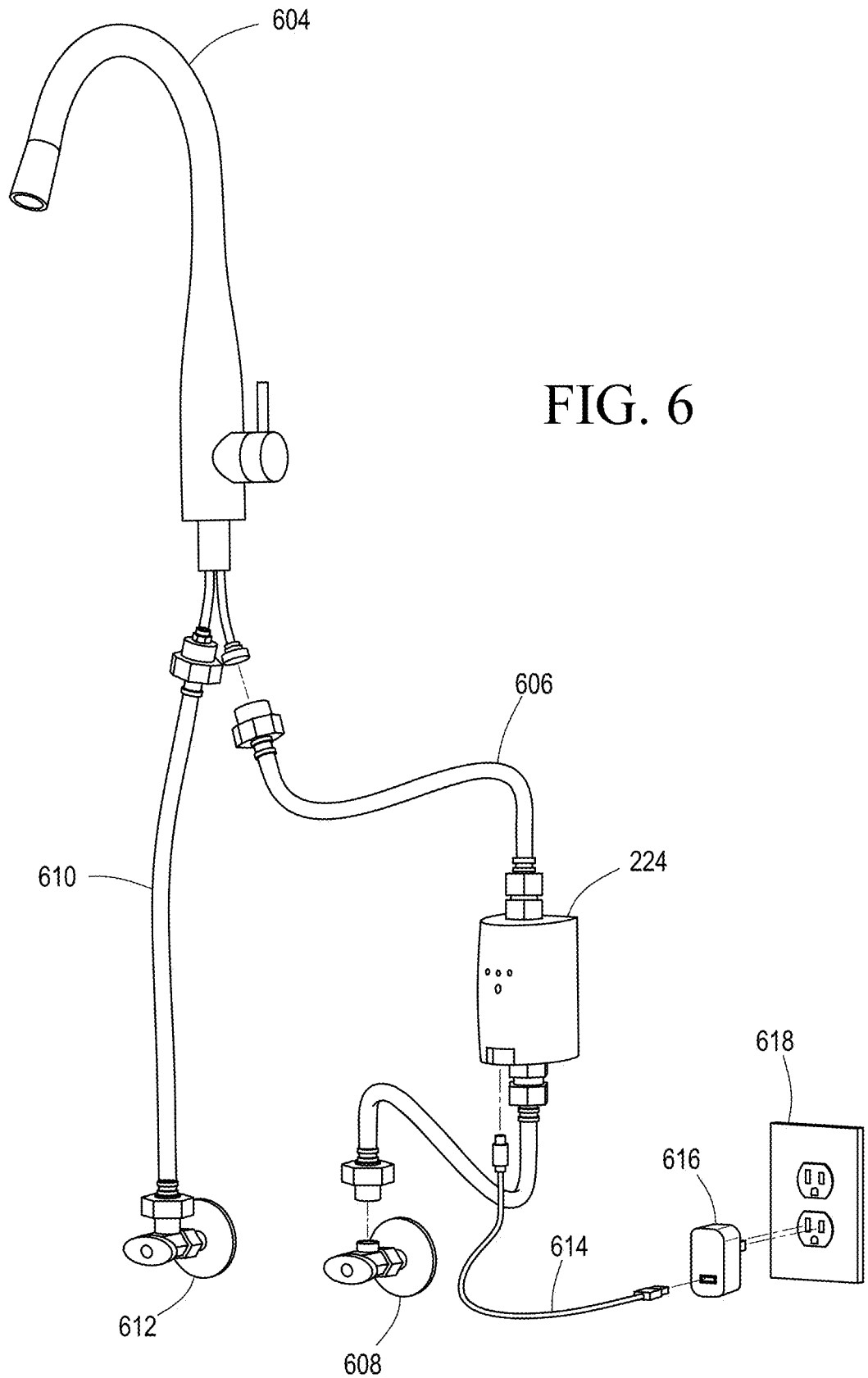
FIG. 6 illustrates installation of the leak detection device of FIG. 2 proximate to a kitchen sink faucet, which can be at a portion of the water system of FIG. 2.

In many embodiments, a leak detection device 224 can be installed in water system 200 to detect leaks, such as shown in FIG. 6 and described below. In several embodiments, leak detection device 224 can be a network device, similar to the network devices 102, 104, or 106, as shown in FIG. 1 and described above. In a number of embodiments, leak detection device 224 can include one or more sensors within piping walls 230 that can be used to gather data used for leak detection. For example, as shown in FIG. 2, the sensors can include a pressure sensor 226 and/or a flow sensor 228. In some examples, leak detection device 224 can include the pressure sensor 226 and not flow sensor 228. In some embodiments in which a flow sensor 228 is included in leak detection device 224, flow sensor 228 can include an in-line flow turbine sensor. A flow turbine sensor can include a rotor that is turned by a liquid force proportional to flow of the liquid in a flow direction 222. For example, liquid flow of the water causes a bladed turbine inside the flow sensor 228 to turn at an angular velocity directly proportional to the velocity of the liquid being monitored. As the blades pass beneath a magnetic pickup coil in the flow sensor 228, a pulse signal is generated. For example, a Hall Effect sensor can be included that supplies pulses used for digital or analog signal processing. Each pulse can represent a discrete volume of liquid. A frequency of the pulse signal can be directly proportional to angular velocity of the turbine and the flow rate. A large number of pulses can provide high resolution. In other examples, flow sensor 228 can include an ultrasonic flow sensor that determines time of flight measurement, an acoustic (Doppler) flow sensor, or any other flow sensor that can monitor flow of a substance and acquire flow data representing the flow. In some embodiments, leak detection device 224 can measure water flow using flow sensor 228. In other embodiments, leak detection device 224 can use flow sensor 228 to detect whether there is water flow without measuring the water flow. In still other embodiments, leak detection device 224 can be devoid of a flow sensor.

In various embodiments, pressure sensor 226 in leak detection device 224 can measure pressure in water system 200 and generate pressure data representing the measured pressure. Leak detection device 224 can includes a processor (e.g., a microcontroller). In some embodiments, the processor can provide a gating signal to close an electronic switch (e.g., a field effect transistor switch) to control sampling of pressure by the pressure sensor. In some cases, a regulated power supply of leak detection device 224 can provide direct current power to energize the pressure sensor.

Various types of pressure sensors (e.g., 226) can be used. For example, a pressure sensor with a pressure range of 0-50 pounds per square inch (PSI) can be used. As another example, a pressure sensor with a pressure range of 0-100 PSI can be used. A pressure sensor with a higher pressure range can be useful for monitoring water pressure in water systems (e.g., 200) with a high supply pressure, or when a pressure regulator is not included in the water system (e.g., 200). One example of a pressure sensor is the PPT7x Series sensor manufactured by Phoenix Sensors. One of ordinary skill in the art will appreciate that other suitable pressure sensors can be used.

In some embodiments, pressure sensor 226 can include a digital pressure transducer that converts pressure into an electrical signal. For example, the pressure sensor can include a diaphragm with strain gauges wired to a circuit that can measure a resistance (e.g., a Wheatstone bridge). Pressure applied to pressure sensor 226 (e.g., pressure from water) causes the diaphragm to deflect, which introduces strain to the strain gauges. The strain produces an electrical resistance change proportional to the pressure. The analog resistance can be converted to a digital signal using an analog-to-digital converter. The digital signal can be output as pressure data.

In many embodiments, the internal pressure in water system 200 can remain approximately constant when no water is being used by a fixture. When a water fixture valve is opened, the pressure within water system 200 can force the water out of an open orifice of the fixture, which can cause the pressure of water system 200 to decrease. Pressure regulator 202 can sense the pressure drop, and can allow pressurized water from the utility system to enter from the utility side to rebalance the pressure of water system 200 to its target or set point level, as shown in FIG. 3.

Figure 3:
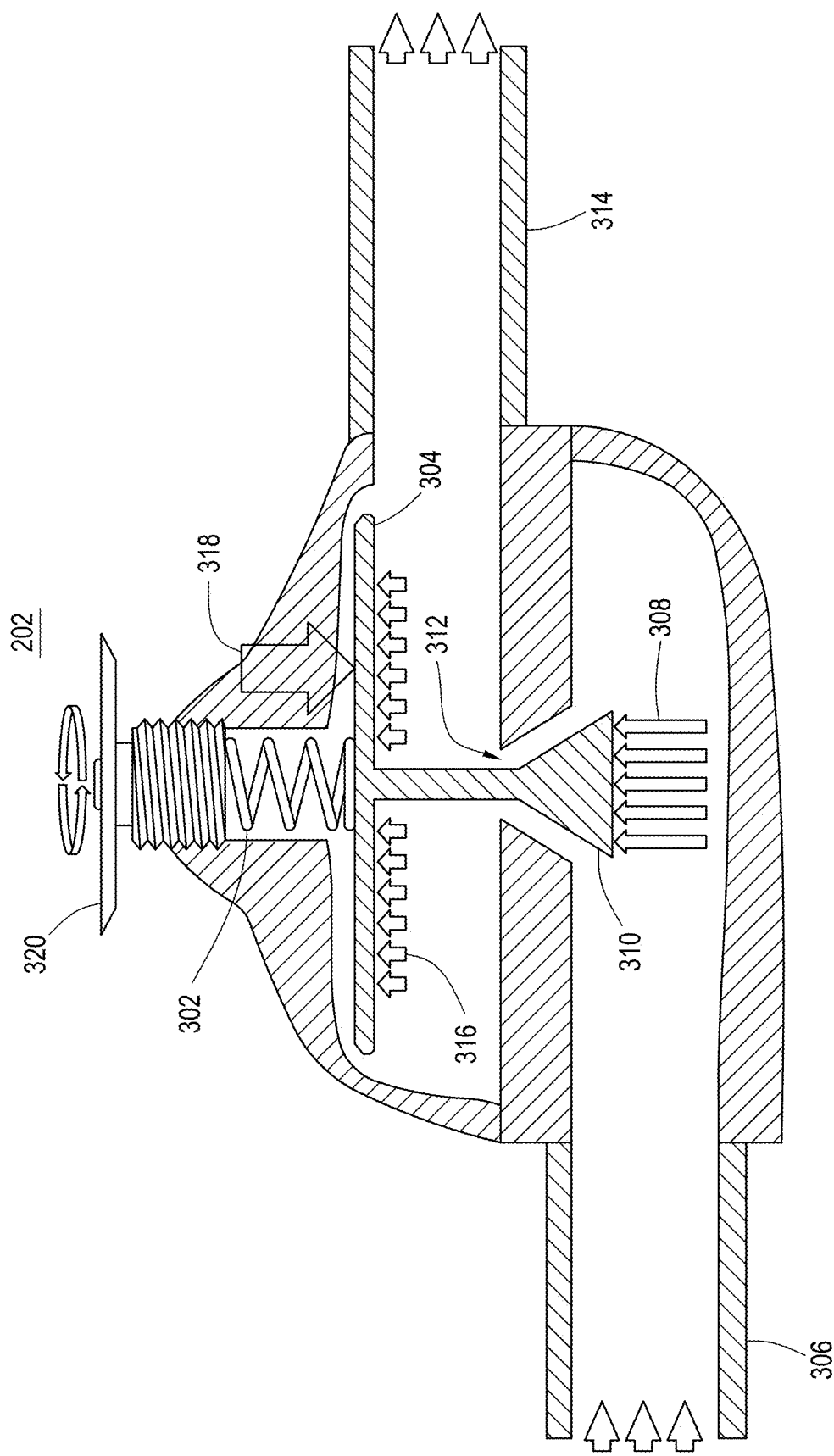
FIG. 3 illustrates a cross-sectional view of the pressure regulator of FIG. 2.

FIG. 3 illustrates a cross-sectional view of pressure regulator 202. The components in pressure regulator 202 can operate to rebalance the pressure when a pressure drop is detected. In a number of embodiments, an orifice 312 of the pressure regulator 202 can be an interface between the utility system and water system 200 (FIG. 2). Orifice 312 can determine the maximal rate of water transfer between the upstream utility (through one or more water lines 306) and the downstream water system 200 (FIG. 2) (through one or more water lines 314). Pressure regulator 202 can include a restricting element 310 (also referred to as a poppet), which can move in an upward or downward direction to further close orifice 312 or further open orifice 312, respectively, to adjust the pressure of water system 200 (FIG. 2), and which can close off orifice 312 when a desired pressure balance is reached. Pressure regulator 202 can include a diaphragm 304 to sense the internal pressure level of water system 200 (FIG. 2), based on the pressure in water lines 314. Pressure regulator 202 can include a loading element 302 (e.g., a spring, a coil, or other loading device), which can push restricting element 310 down to enable the inflow of water from the utility system to water system 200 (FIG. 2) when the sum of an internal pressure 316 acting along diaphragm 304 and a utility pressure 308 acting along the lower surface of restricting element 310 is not sufficient to counter the a loading force 318 of loading element 302 on diaphragm 304. Thus, the force interactions are between loading element 302 pushing down against the upper surface of diaphragm 304 with loading force 318 directed downward, which works against force 308 generated by the utility pressure directed upward on the lower surface of restricting element 310 combined with force 316 generated by internal pressure of water system 200 (FIG. 2) pressing upward along the lower surface of diaphragm 304. Loading force 318 applied by loading element 302 can be set or adjusted to a set point water pressure using a set point pressure adjustment screw 320. Loading element 302, diaphragm 304, and restricting element 310 together can enable pressure regulator 202 to maintain a desirable pressure in water system 200 (FIG. 2), which can be not too low during periods of heavy internal water usage and can be not too high when the external utility system pressure increases.

Various different properties or factors of pressure regulators (e.g., pressure regulator 202) can lead to different styles of variations in pressure signals that occur within a building when water is used (e.g., when water is allowed to flow out from a fixture or there is a leak in water system 200 (FIG. 2)). For example, high pressure droop events and/or low pressure droop events can occur depending on the properties of the pressure regulator 202. As used herein, "droop" refers to an amount of deviation from the set point pressure of water system 200 at a given downstream flow rate when water is used. For example, droop refers to the drop in pressure as a result of water usage inside a building.

Differences in pressure droop can be the result of a mixture of differences between properties or factors of pressure regulators (e.g., 202), including loading force 318 of loading element 302, the surface area of diaphragm 304, and the size of the orifice 312 around restricting element 310. For example, high droop can be attributed to one or more of a high spring constant of loading element 302 (e.g., the amount of force it takes to extend or compress loading element 302), a large surface area of diaphragm 304, and/or a small surface area of orifice 312. In another example, low droop can be due to one or more of a low spring constant of loading element 302, a small surface area of diaphragm 304, and/or a large surface area of orifice 312.

Figure 4A:
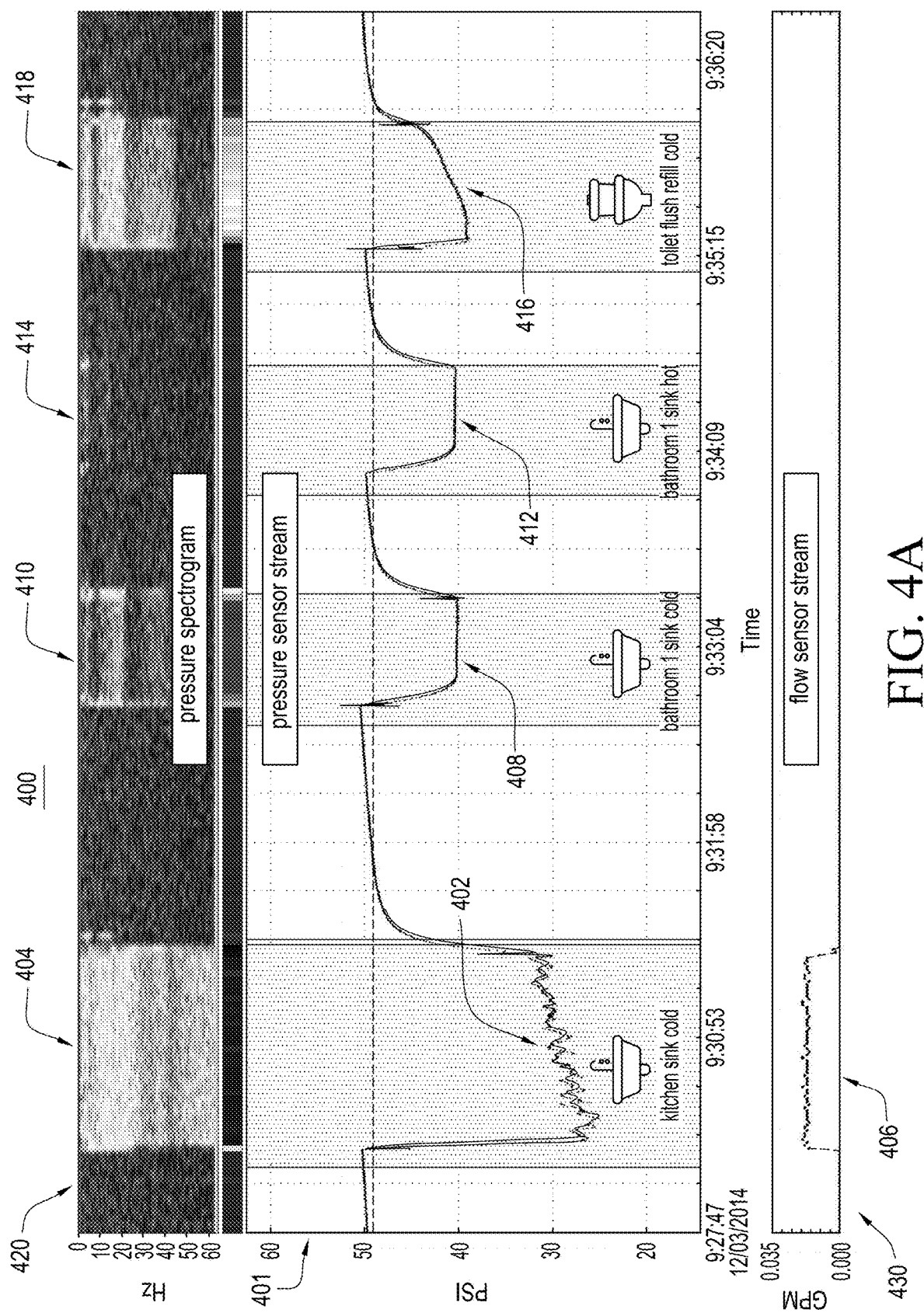
FIG. 4A illustrates graphs showing variations in pressure and flow in a water system having a pressure regulator that results in a high pressure droop when various fixtures of the water system are used.

Turning ahead in the drawings, FIG. 4A illustrates graphs 400 showing variations in pressure and flow in a water system having a pressure regulator that results in a high pressure droop when various fixtures of the water system are used. Specifically, a top graph of FIG. 4A illustrates a pressure spectrogram 420, a middle graph of FIG. 4A illustrates a pressure sensor stream 401, and a bottom graph of FIG. 4A illustrates a flow sensor stream 430.

Pressure sensor stream 401 can be a raw pressure stream time domain signal, as measured in PSI. Pressure sensor stream 401 shown in FIG. 4A is sampled at 244.1406 samples per second, but other sampling rates can be used. Pressure spectrogram 420 can be a frequency domain representation using a spectrogram, where frequencies are represented in Hertz (Hz). The data in pressure spectrogram 420 shown in FIG. 4A can be derived using a frequency transform, such as a fast Fourier transform (FFT). For example, the length of the transform (e.g., the NFFT variable in Matlab) can be set to 1024 (equivalent to approximately 4.19 seconds), with 50% overlapped Kaiser Windows (beta 15). Events demonstrating the high pressure droop occur at pressure drops 402, 408, 412, and 416. A pressure sensor (e.g., a pressure transducer or other pressure sensing device, such as pressure sensor 226 (FIG. 2)) can be installed in water system 200 (FIG. 2) to monitor the pressure and detect the pressure of water system 200, including pressure drops 402, 408, 412, and 416. In the example of FIG. 4A, the pressure sensor is installed at the kitchen sink, causing pressure drop 402 at the kitchen sink to have a significantly higher pressure drop when compared to the other three pressure drops (e.g., 408, 412, and 416). The higher pressure drop at pressure drop 402 can occur due to the pressure sensor being closer to the open valve orifice of the kitchen sink, which is the point of the largest pressure dis-equilibrium in water system 200 (FIG. 2). Frequency variations 404, 410, 414, and 418 are also shown in pressure spectrogram 420, which correspond respectively to pressure drops 402, 408, 412, and 416 in pressure sensor stream 401.

Flow sensor stream 430 can be a measure of flow through a flow sensor (e.g., 228 (FIG. 2)), as measured in gallons per minute (GPM). In some embodiments, a flow sensor (e.g., flow sensor 228 (FIG. 2)) can be installed in water system 200 (FIG. 2), such as at the kitchen sink, to monitor the amount of flow of water at the flow sensor. Flow increase 406 in flow sensor stream 430 can correspond to the flow of water during pressure drop 402 at the kitchen sink. Flow increases do not occur at the other pressure drops (e.g., 408, 412, and 416) due to the flow sensor not being installed at the fixtures causing those pressure drops.

Figure 4B:
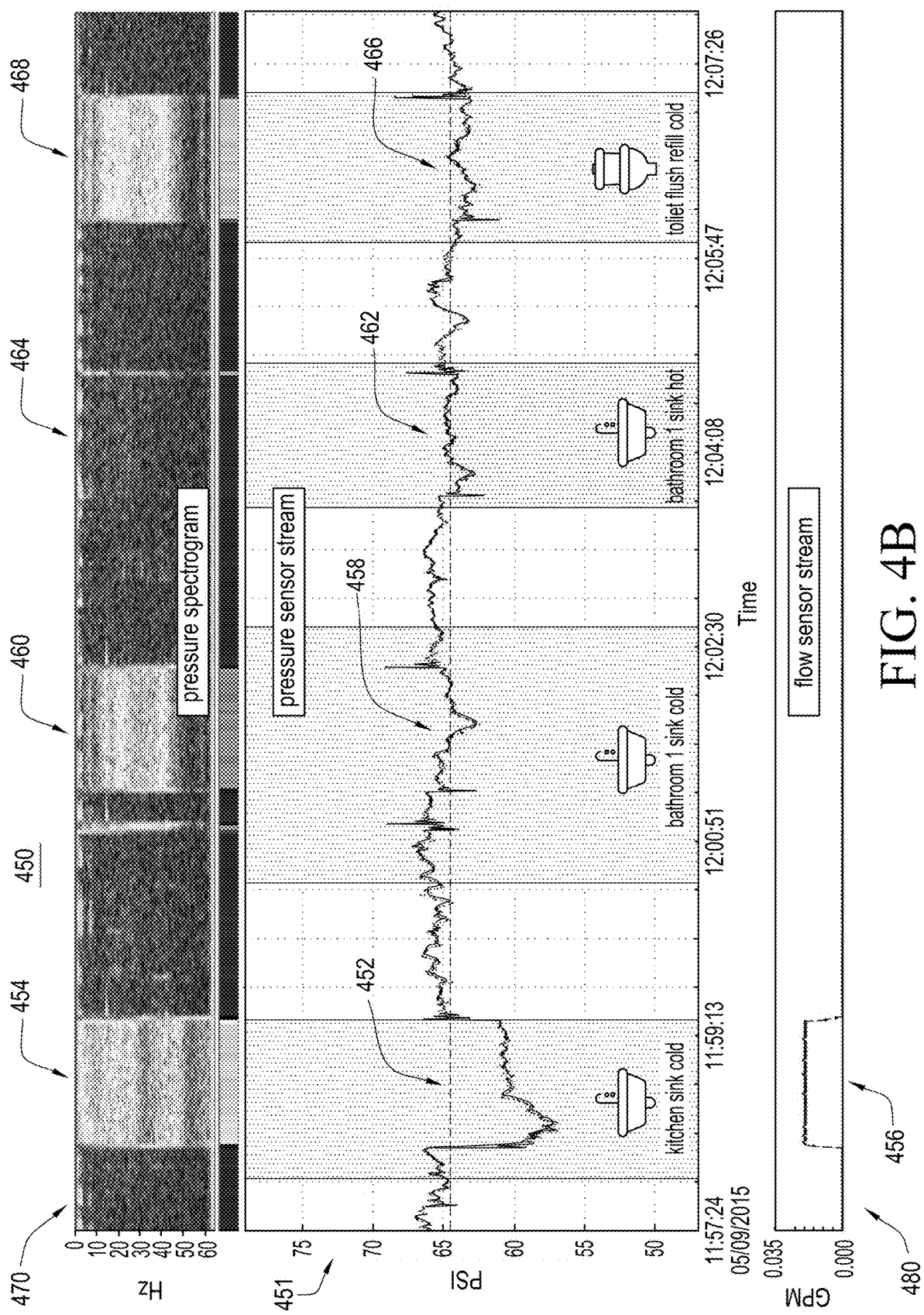
FIG. 4B illustrates graphs showing variations in pressure and flow in a water system having a pressure regulator that results in a low pressure droop when various fixtures of the water system of are used.

FIG. 4B illustrates graphs 450 showing variations in pressure and flow in a water system having a pressure regulator that results in a low pressure droop when various fixtures of the water system are used. Specifically, a top graph of FIG. 4B illustrates a pressure spectrogram 470, a middle graph of FIG. 4B illustrates a pressure sensor stream 451, and a bottom graph of FIG. 4B illustrates a flow sensor stream 480.

Pressure sensor stream 451 can be a raw pressure stream time domain signal. The sampling used for pressure sensor stream 451 can be similar or identical to the sampling used for pressure sensor stream 401 (FIG. 4A). Pressure spectrogram 470 can be a frequency domain representation using a spectrogram, which can use a similar or identical transform as used for pressure spectrogram 420 (FIG. 4A). Events demonstrating the low pressure droop occur at pressure drops 452, 458, 462, and 466. As described above, the low pressure droop occurs instead of the high pressure droop because of different properties in the pressure regulator (e.g., 202 (FIGS. 2-3)), which enable faster rebalancing of the internal pressure. Frequency variations 454, 460, 464, and 468 are also shown in pressure spectrogram 470, which correspond respectively to pressure drops 452, 458, 462, and 466 in pressure sensor stream 451.

Flow sensor stream 480 can be a measure of flow through a flow sensor (e.g., 228 (FIG. 2)). Flow increase 456 in flow sensor stream 480 can correspond to the flow of water during pressure drop 452 at the kitchen sink. Flow increases do not occur at the other pressure drops (e.g., 458, 452, and 466) due to the flow sensor not being installed at the fixtures causing those pressure drops.

Leaks can occur in a pressurized system for various reasons, such as physical damage to supply lines or fixtures, natural degradation of materials, clogs in supply lines or fixtures, or other causes. The pressure of the water within a pressurized water system (e.g., water system 200) varies as water is used, as discussed above, as well as when leaks occur. Leaks also occur in gas-supply systems that deliver pressurized gas to buildings or venues for gas-powered items. Leaks can lead to losses of water, gas, or other substances, and can also reduce pressure below a desired level. Leaks can cause pressure drop events, which can be high pressure droop events or low pressure droop events, depending on differences among the pressure regulator (e.g., 202 (FIGS. 2-3)) being used in the system.

Figure 5:
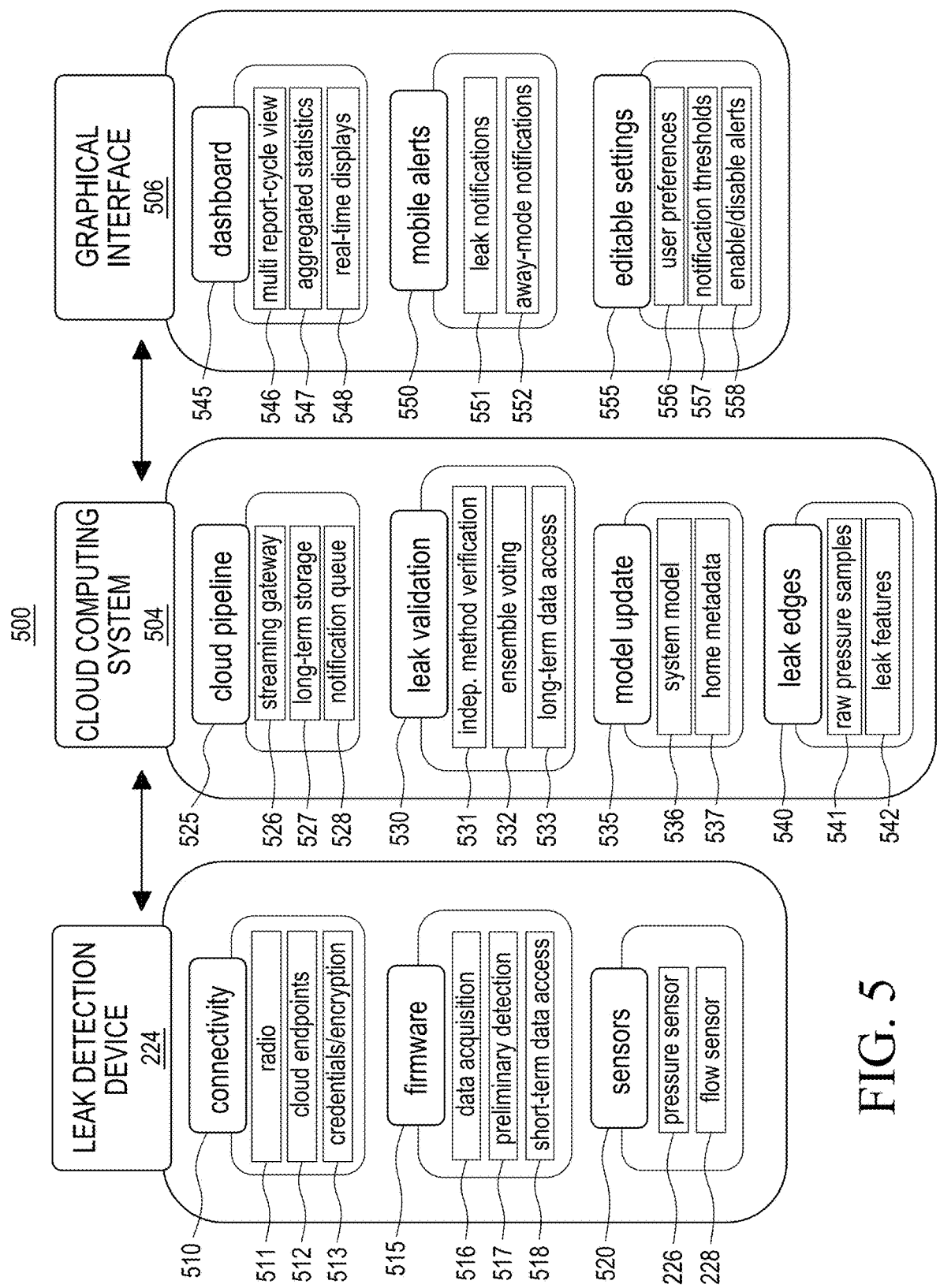
FIG. 5 illustrates a block diagram of an exemplary leak detection system, which can be used to implement various leak detection techniques to detect leaks in a pressurized system using pressure data, according to an embodiment.

FIG. 5 illustrates a block diagram of an exemplary leak detection system 500, which can be used to implement various leak detection techniques to detect leaks in a pressurized system (e.g., water system 200 (FIG. 2)) using pressure data. Leak detection system 500 is merely exemplary and is not limited to the embodiments presented herein. The leak detection system can be employed in many different embodiments or examples not specifically depicted or described herein. For example, an unintentional loss of water through an opening in a pressurized system (e.g., orifice, hole, puncture, crack, break, fissure, rupture, or the like) can be detected. Some leak detection techniques use water velocity measurements (or flow) at the intersections of the utility provided upstream pressure and a venue's internal downstream pressure. Longitudinal observations of a flow measurement signal can be used to detect a lack of quiet periods or pauses in flow. For example, if there is not a one-hour period of no flow in a 24-hour observation period, a leak is highly likely. Unlike these techniques that rely on flow measurement data, the systems and techniques described herein can analyze pressure signal data in the time domain, frequency domain, or both the time and frequency domain to detect leaks. Advantages of using pressure data to detect leaks include the ability to provide rapid response times (e.g., in cases of catastrophic or large leaks), characterization of leak type, detection of small periodic leaks, and disaggregation of water activity.

In many embodiments, leak detection system 500 can include leak detection device 224, a cloud computing system 504, and/or a graphical interface 506. In many embodiments, leak detection device 224 can be a network device, similar to the network devices 102, 104, or 106, as shown in FIG. 1 and described above. As described below, leak detection device 224 can monitor pressure and detect certain characteristics of the pressure to detect leaks. In some embodiments, leak detection device 224 can monitor flow of water, and can supplement the pressure analysis with flow analysis, as described above. In several embodiments, leak detection device 224 can be installed in a pressurized system (e.g., water system 200 (FIG. 2)). For example, leak detection device 224 can be attached to a supply line in water system 200 (FIG. 2).

FIG. 6 illustrates installation of leak detection device 224 proximate to a kitchen sink faucet 604, which can be at a portion of water system 200 (FIG. 2). Leak detection device 224 and the portion of water system 200 (FIG. 2) depicted in FIG. 6 are merely exemplary and are not limited to the embodiments presented herein. Leak detection device 224 can be deployed and/or installed in many different embodiments or examples not specifically depicted or described herein. In the example of FIG. 6, leak detection device 224 is installed in a cold water supply line 606 of a kitchen sink faucet 604. Cold water supply line can be part of cold water lines 232 (FIG. 2), and kitchen sink faucet 604 can include or be part of kitchen faucet 206 (FIG. 2). For example, leak detection device 224 can be threaded into a faucet bib so that the water flows through leak detection device 224. One of ordinary skill in the art will appreciate that leak detection device 224 can be coupled with any water supply line in water system 200 (FIG. 2) or another pressurized system. For instance, leak detection device 224 can be installed in the hot water supply line 610, which can be part of hot water lines 234 (FIG. 2). For example, leak detection device 224 can be installed in hot water supply line when a tankless water heater is used. In many water systems (e.g., water system 200 (FIG. 2)), a cold water shutoff valve 608 and/or a hot water shutoff valve 612 can be provided at one or more fixtures to allow or disallow water to flow to the fixture (e.g., kitchen sink faucet 604). In many embodiments, leak detection device 224 can be installed in a single location of water system 200, and leak detection device 224 can detect leaks in water system 200 with only a single leak detection device (e.g., 224) with a single pressure sensor (e.g., 226).

As described above, leak detection device 224 can be a network device with similar functionalities as the network device 102, 104, or 106 (FIG. 1), which can require power to operate. A power adapter 616 can connect to the leak detection device 224 through a power cord 614 in order to provide power to leak detection device 224. In some embodiments, power cord 614 can connect to the leak detection device 224 and to power adapter 616 through serial connections (e.g., a Universal Serial Bus (USB), a Lightning bus, or other serial connection), or another suitable connection. Power adapter 616 can be plugged into a power outlet 618, which can include a 120 volt power outlet or other suitable outlet.

Returning to FIG. 5, in a number of embodiments, leak detection device 224 can include connectivity components that can allow leak detection device 224 to communicate with cloud computing system 504 and, in some cases, with a user device (e.g., a user mobile device) that executes and presents graphical interface 506 to a user. In other embodiments, cloud computing system 504 can communicate with the user device and present graphical interface 506 to the user. In a number of embodiments, the user device can be similar or identical to access device 108 (FIG. 1).

In several embodiments, leak detection device 224 can include connectivity components 510, which can include radio components 511, such as a wireless transceiver radio or interface, such as a WiFi™ transceiver radio or interface, a Bluetooth™ transceiver radio or interface, a Zigbee™ transceiver radio or interface, an UWB transceiver radio or interface, a WiFi-Direct transceiver radio or interface, a BLE transceiver radio or interface, an IR transceiver, and/or any other wireless network transceiver radio or interface that allows leak detection device 224 to communicate with cloud computing system 504 or the user device over a wired or wireless network. In some cases, radio components 511 (e.g., wireless transceiver) can allow leak detection device 224 to communicate with cloud computing system 504. Radio components 511 can transmit the pressure data to the cloud computing system 504, which can also analyze the pressure data. In some cases, connectivity components 510 can include a cloud endpoint component 512, which can be configured to interface with cloud computing system 504. For example, cloud endpoints component 512 can stream data to cloud computing system 504. In some cases, connectivity components 510 can include a credentials and encryption component 513, which can allow leak detection device 224 to securely access cloud computing system 504. For example, leak detection device 224 can have a signature that is used to access the cloud computing system 504. Cloud computing system 504 can process the signature in order to authenticate leak detection device 224.

In several embodiments, leak detection device 224 can include one or more sensors 520, such as pressure sensor 226 and/or flow sensor 228, as described above in greater detail.

In many embodiments, leak detection device 224 can include firmware 515. In some embodiments, firmware 515 can include a data acquisition component 516, which can receive and/or convert signals received from sensors 520. For example, when one or more of sensor 520 provides an analog signal, data acquisition component can include one or more analog-to-digital converters to convert the analog signal to digital data. In several embodiments, firmware 515 can include a preliminary detection component 517, which can perform at least in part one or more of the leak detection techniques described herein. In a number of embodiments, firmware 515 can include a short-term data access 518, which can store and/or access data that has been recently acquired, such as the data sensed over the previous 2 hours. In many embodiments, the data acquired can be uploaded to cloud computing system 504, which can store long-term data for covering longer durations than the short-term data stored in leak detection device 224.

Cloud computing system 504 can communicate with one or more leak detection devices (e.g., leak detection device 224), such as leak detection devices installed in many water systems (e.g., water system 200 (FIG. 2)). In some embodiments, cloud computing system 504 can be implemented in a dedicated cloud computing platform, a physical and/or virtual partition of a cloud computing platform, a limited access (e.g., subscription access) to a cloud computing platform, and/or another suitable cloud computing implementation. In other embodiments, cloud computing system 504 can be a computing system, such as computing system 1400 (FIG. 14), described below, that is not part of a cloud computing platform. In many embodiments, cloud computing system 504 can include cloud pipeline components 525. In many embodiments, cloud pipeline components 525 can include a streaming gateway 526, which can acquire data, such as on a streaming and/or continual basis, from one or more leak detection devices (e.g., 224). In several embodiments, cloud pipeline components 525 can include a long-term storage component 527, which can store and/or access data that has been streamed from the one or more leak detection devices (e.g., 224) to cloud computing system 504. In a number of embodiments, cloud pipeline components 525 can include a notification queue 528. When one of the one or more leak detection devices (e.g., 224) detects a potential leak, the leak detection device (e.g., 224) can send a notification to cloud computing system 504. Cloud computing system 504 can add the received notifications to notification queue 528 to process the notification when there are sufficient resources on cloud computing system 504.

In a number of embodiments, cloud computing system 504 can include leak validation components 530, which can be used for detecting and/or validating leaks, and, in some embodiments, determining types and characteristics of leaks. In some embodiments, leak validation components 530 can include an independent method verification component 531, which can process the notification sent from the leak detection device (e.g., 224) to independently determine if there is a leak based on the additional information (e.g., historical data) available in cloud computing system 504.

In several embodiments, leak validation components 530 can include a long-term data access component 533, which can store and/or access data stored in long-term storage 527. In a number of embodiments, independent method verification component 531 can detect leaks based on this larger data set even when the leak detection device (e.g., 224) has not detected a potential leak and/or sent a notification. In many embodiments, independent method verification component 531 can determine a confidence level of a leak for each independent leak detection technique that is used, as described below in further detail. For example, an approximately 80% or higher confidence level (referred to herein as a Threshold 1 confidence level) returned from a technique can indicate a strong likelihood of a leak. An approximately 60%-80% confidence level (referred to herein as a Threshold 2 confidence level) returned from a technique can indicate a weak confidence of a leak. A less than approximately 60% confidence level (referred to herein as a Threshold 3 confidence level) returned from a technique can indicate no confidence in a leak, as a leak is unlikely.

In many embodiments, leak validation components 530 can include an ensemble voting component 532, which can use confidence levels determined by independent method verification component 531 to determine whether to indicate to a user that there is a likely leak. For example, ensemble voting component 532 can take into account the confidence levels returned from multiple techniques, as described below in greater detail.

In several embodiments, cloud computing system 504 can include model update components 535. Model update components 535 can be used to model different systems (e.g., water system 200 (FIG. 2)). For example, model update components 535 can include a system model 536, which can store and/or access parameters relating to the specific system (e.g., water system 200 (FIG. 2)) in a home metadata database 537, and which can develop a model that characterizes properties of the specific system. In many embodiments, system model 536 can include a historic model of the system (e.g., water system 200 (FIG. 2)). For example, home metadata database 537 can include information related to the plumbing infrastructure of the system, such as the nominal pressure of the system; statistics related to pressure, such as mean, median, mode, and/or standard deviation, etc.; the make, model, and/or type of pressure regulator; the location, style, size, and/or age of the system; materials of the pipes; the quantity, location, and/or types of fixtures in the system; climatic conditions during leak detection; user input and/or feedback regarding leak notifications, such as whether there is a leak and the nature and/or size of the leak. Such information can be gathered through the user, through public information records, through information gathered using independent or third-party sources, and/or through other suitable sources.

In many embodiments, user-defined information can be included in system model 536. For example, the user can specify dates and/or times when the user expects that there will be no water usage. This information can be set by users when they go to work or on vacation. During these time periods, either one or a combination of the techniques described below can be used to search for uses of water. Any events that are triggered can generate an alert notification for the user. Additionally, cloud computing system 504 can ask the user for feedback to determine periods when there is expected to be minimal water usage, such as between 12 a.m. and 6 a.m. This user-defined information can enable learning of user behavior and activity, which can allow system model 536 to detect leaks based on more accurate confidence levels.

In a number of embodiments, cloud computing system 504 can include leak edges component 540. In many embodiments, leak edges component 540 can include raw pressure samples 541 and/or leak features 542. Raw pressure samples 541 can include pressure samples in a time domain that represent edges. An "edge" can be a boundary at which the pressure signal exhibits a noticeable change in behavior by either a decrease or an increase from the pressure values before it. Edges can include open edges, which can correspond to a valve open event of a fixture, which can be represented by an initial drop in pressure followed by oscillations that last for a certain amount of time, such as at least 3 seconds. A close edge can correspond to a valve close event of a fixture, which be represented by an initial rise in pressure followed by oscillations that last for a certain amount of time, such as at least 3 seconds. The oscillations can be due to a "hammer" effect that occurs when fixtures are turned on or off, based on a displacement and sloshing back and forth of fluid (e.g., water) within the water system (e.g., 200), which results in oscillations of pressure at the pressure sensor. In some embodiments, other edges that do not meet the 3 second oscillation can be characterized as leak edges. Signature edges for different fixtures and/or appliances in water system 200 can be stored in leak features 542. In many embodiments, raw pressure signals that are determined to be leaks (e.g., through edge analysis, by any techniques described herein, through machine learning, through user feedback labeling, etc.) can be stored in raw pressure samples 541 along with their features in leak features 542. These databases of leak types can be utilized for faster verification of leaks and generation of quicker alerts when leaks are detected. These databases also can allow comparison of different leak types which can increase the confidence in the nature of the leak.

In many embodiments, cloud computing system 504 can provide scalable analytics and storage as well as elements for notifying users of leaks through graphical interface 506, which may include a mobile or web interface, or another suitable interface. In many embodiments, for example, graphical interface 506 can include a dashboard component 545, which can provide a multi report-cycle view 546, such as reports of events and/or leaks over a time period, aggregated statistics 547, and/or real-time displays 548, such as current status of water system 200 (e.g., whether there are any current leaks detected, pressure readings, fixtures used, etc.).

In a number of embodiments, graphical interface 506 can provide mobile alerts 550. For example, mobile alerts 550 can include leak notifications 551, which alert the user when leak detection device and/or cloud computing system 504 detect a leak. In many embodiments, the user can provide feedback on whether there actually is a leak and the size and/or nature of the leak, which can be incorporated to improve future leak detection. In several embodiments, mobile alerts 550 can include away-mode notifications, which can be alerts that there is activity in water system 200 when the user is away and no water use is expected. As described above, the user can input when the user is away or expected to be away.

In various embodiments, graphical interface 506 can include editable settings components 555, which can allow the user to input user preferences 556, notification thresholds 557, and/or to enable or disable alerts 558.

In many embodiments, leak detection device 224 and cloud computing system 504 can analyze the pressure data obtained by pressure sensor 226 to detect an occurrence of leaks and/or types of leaks that have occurred. For example, the pressure data output from pressure sensor 226 can be analyzed by the processor of leak detection device 224 in order to detect leaks, and the pressure data can be streamed to cloud computing system 504. A cloud computing fabric in the cloud computing system 504 can ingest data sent from multiple deployed leak detection devices, and can analyze the data to perform one or more leak detection techniques. In some cases, leak detection device 224 can communicate other information to the cloud computing system 504, such as reporting information regarding leaks, requesting verification of a leak, and/or other information. Pressure data from the pressure sensor 226 (and in some cases flow data from the flow sensor 228) can be analyzed in the frequency domain, in the time domain, or in both the frequency and time domains to identify leaks and to differentiate different types of leaks. Various different techniques for analyzing the pressure stream in the time and/or frequency domain to detect leaks are shown below in Table 1.

TABLE 1

| Technique | Name | Brief Description |
|---|---|---|
| M1 | Turbulence | Persistent turbulence in a frequency range (duration exceeds notification time threshold). |
| M2 | Pressure Slope | Monotonic pressure downward slope with periodic pressure valve resets to the pressure set point. |
| M3 | Pressure Floor | Pressure values detected below historic pressure floor. |
| M4 | Stable Pressure Variation | Stable pressure variation exceeds N standard deviations relative to typical/calibrated stable pressure. |

The four techniques, M1-M4, in Table 1 can be used by leak detection device 224 and/or cloud computing system 504 to identify characteristics of the pressure data to detect leaks. In some cases, leak detection device 224 can include lightweight versions of algorithms that perform the four leak detection techniques M1-M4. Basic versions of the techniques can operate within leak detection device 224 on the data collected from the pressure sensor collected and/or stored in leak detection device 224. For example, the techniques can be executed and run in firmware 515 of the leak detection device 224.

In many embodiments, each of the leak detection techniques can detect non-cyclical pressure events that correspond to water leaks. Non-cyclical pressure events can be contrasted with cyclical pressure events. For example, a faulty toilet flapper valve on a toilet can result in a leak in the toilet reservoir tank that is periodically refilled by the toilet fill valve when the tank level drops below a refill threshold. The pressure event corresponding to these refill events is cyclical, as the pressure event starts then is interrupted by a control system (e.g., the toilet fill valve), and the event repeats periodically (e.g., every 7 minutes) over time. By contrast, a non-cyclical pressure event does not repeat over time. Rather, the non-cyclical pressure event starts, but does is not interrupted by a control system. Instead, the pressure event continues, except for certain environmental factors that can temporarily limit the leak. As an example of such an environmental factor, when an irrigation system springs an underground leak, water leaks out relatively steadily into the soil surrounding the leaky pipe until the ground around the pipe is saturated, at which point the saturated ground around the pipe can limit the leak while the water disperses in the surrounding soil.

Figure 7:
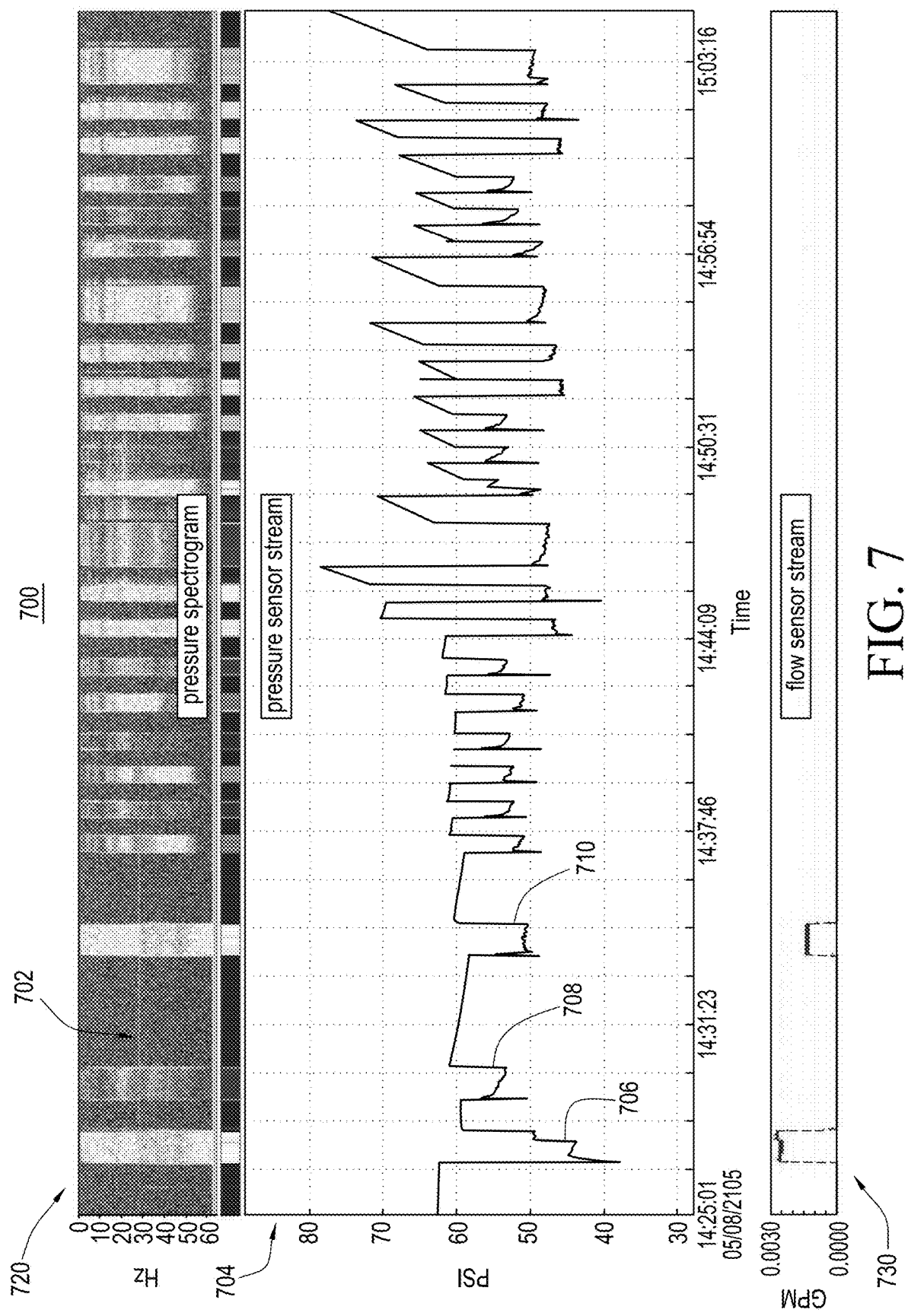
FIG. 7 illustrates graphs showing examples of pressure events detected using a first leak detection technique.

Turning ahead in the drawings, FIG. 7 illustrates graphs 700 showing examples of pressure events detected using leak detection technique M1. Specifically, graphs 700 include a pressure spectrogram 720 in a top graph, a pressure sensor stream 704 in a middle graph, and a flow sensor stream 730 in a bottom graph. Pressure sensor stream 704 can be a raw pressure stream time domain signal as measured by pressure sensor 226 (FIG. 2). Pressure spectrogram 720 can be a frequency domain representation using a spectrogram, as transformed from pressure sensor stream 704. Flow sensor stream 730 can be a measure of flow through flow sensor 228 (FIG. 2).

In several embodiments, the first leak detection technique M1 can use a frequency domain representation (including frequency domain characteristics) of the raw pressure sensor samples as a basis of analysis. The raw pressure samples are represented by pressure sensor stream 704. The frequency domain representation is shown in pressure spectrogram 720. Technique M1 can detects persistent or prolonged narrow band nonharmonic energy that lasts beyond a system-defined temporal threshold in a certain frequency range. The frequency energy changes can be computed relative to a baseline that is learned during calibration of leak detection device 224 (FIGS. 2, 5-6) when none of the water fixtures are being used and/or during low activity times (e.g., the user can input that 1 a.m. to 5 a.m. are times when the user typically does not use water). For example, the baseline can be updated by cloud computing system 504 (FIG. 5) using information detected during low activity times to track signal changes over time. For example, M1 can detect when there is a prolonged change (e.g., increase and/or decrease) in frequency energy that is observed in a frequency range. In many embodiments, the temporal threshold can be approximately 45 minutes. In other embodiments, it can be another suitable time period, such as approximately 1 hours, 1.5 hours, 2 hours, 2.5 hours, or 3 hours.

In a number of embodiments, the frequency range analyzed in technique M1 can be approximately 0-100 Hz. In several embodiments, the frequency range can be approximately 0-50 Hz. In other embodiments, the frequency range can be approximately 10-100 Hz, 20-90 Hz, 20-50 Hz, 30-50 Hz, or another suitable frequency range. In many embodiments the narrow band of energy can have a width of less than approximately 3 Hz. In other embodiments, the narrow band of energy can have a width of less than approximately 2 Hz, 1 Hz, or 0.5 Hz. The narrow band of energy can be observed as turbulence. For example, technique M1 can detect a consistent, prolonged turbulence introduced into the pressurized system as a result of a leak (e.g., a perpetually open downstream orifice), which produces incessant turbulent flow and hence fluctuations in water system 200 (FIG. 2). The turbulence can be generated due to water constantly escaping water system 200 (FIG. 2) due to the leak, and pressure regulator 202 (FIG. 2) replenishing the water pressure, which causes a chop or turbulence in the pressure stream. As shown in FIG. 7, a leak turbulence signature 702 is visible in the frequency domain as a faint, though perceptible, and perpetual or prolonged narrow band of energy around the approximately 30 Hz range extending through the entirety of the pressure spectrogram 720. It can also be seen from FIG. 7 that turbulence from intentional water use events (e.g., pressure events 706, 708, and 710) drown out leak turbulence signal 702. However, the presence of the leak turbulence signal 702 is apparent and detectable between water use events in which no water is intentionally being used.

In some embodiments, leak detection device 224 (FIGS. 2, 5-6) and/or cloud computing system 504 (FIG. 5) can determine the center frequency, an intensity, and/or width of the detected frequency band. Example of leaks that can be detected using technique M1 are leaks in an irrigation system, such as underground leaks, ruptures of a hose in a dishwasher or clothes washing machine, among other leaks.

In instances when water heater 204 (FIG. 2) in water system 200 (FIG. 2) is a tank-type water heater, technique M1 can lessen the effectiveness of capturing leaks in hot water lines 234 (FIG. 2) when the pressure samples are being collected by leak detection device 224 (FIGS. 2, 5-6) in a location along cold water lines 232 (FIG. 2). This result is mainly due to the large water reservoir of water heater 204 (FIG. 2) dampening any energy bands that would be produced along hot water lines 234 (FIG. 2). In some instances, the water system 200 (FIG. 2) can include a tankless water heater that does not include a reservoir of water. When a tankless water heater is used, technique M1 can be used to effectively detect leaks in the hot water lines 234 (FIG. 2) in addition to the cold water lines 232 (FIG. 2) when leak detection device 224 (FIGS. 2, 5-6) is located along cold water lines 232 (FIG. 2).

Figure 8:
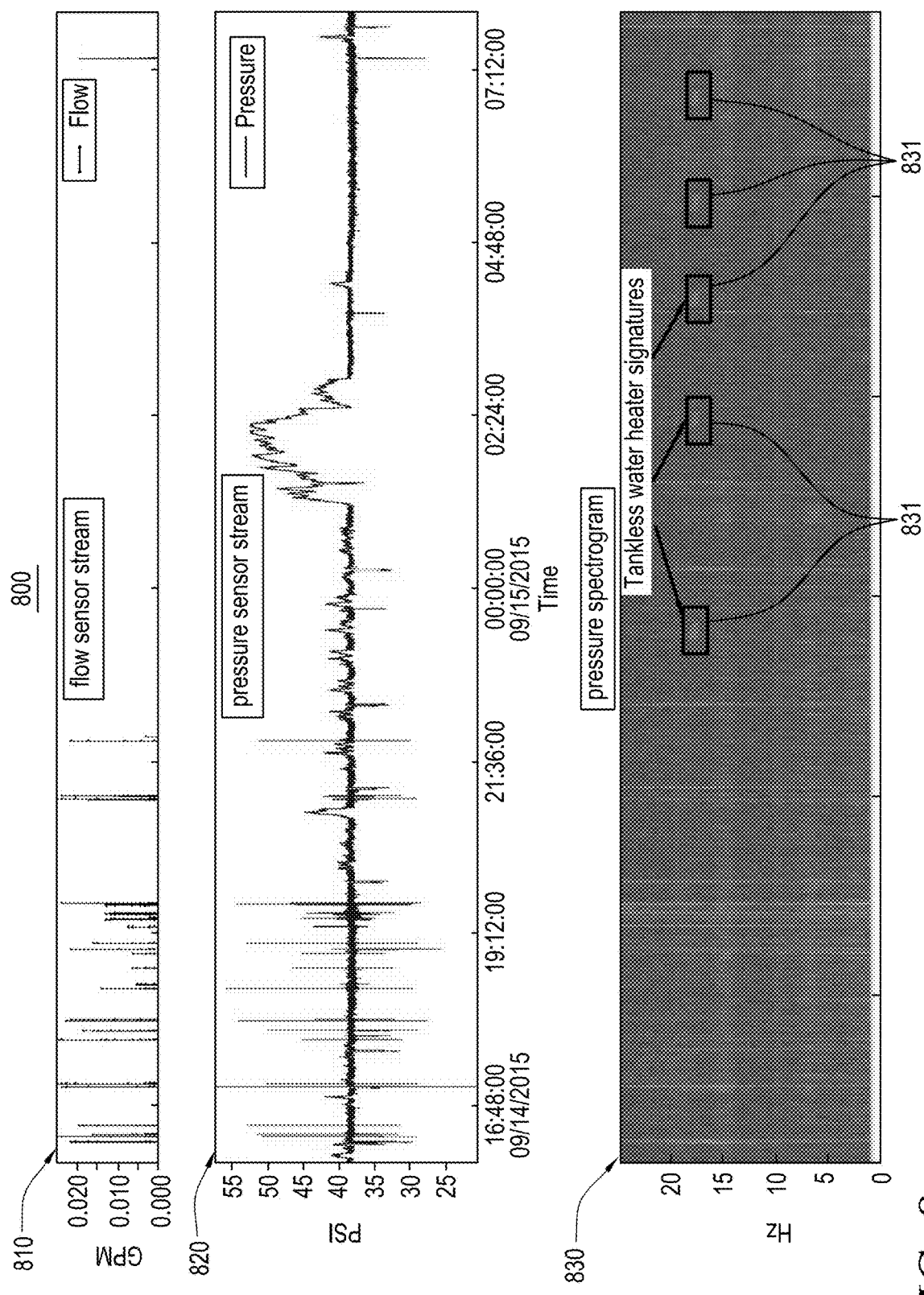
FIG. 8 illustrates graphs showing examples of pressure events corresponding to a tankless water heater.

Turning ahead in the drawings, FIG. 8 illustrates graphs 800 showing examples of pressure events corresponding to a tankless water heater. Specifically, graphs 800 include a flow sensor stream 810 in a top graph, a pressure sensor stream 820 in a middle graph, and a pressure spectrogram 830 in a bottom graph. Pressure sensor stream 820 can be a raw pressure stream time domain signal as measured by pressure sensor 226 (FIG. 2). Pressure spectrogram 830 can be a frequency domain representation using a spectrogram, as transformed from pressure sensor stream 820. Flow sensor stream 810 can be a measure of flow through flow sensor 228 (FIG. 2). In many embodiments, pressure spectrogram 830 can include pressure events 831 corresponding to use of the tankless water heater that exhibit a unique signature at a band of energy. Pressure events 831 in this case can have a center frequency of approximately 17 Hz with a width of approximately 1 Hz. Signatures from pressure events 831 can be used as a baseline to build a model of appliances in the home. Any significant change (e.g., prolonged, based on the temporal threshold described above) from the baseline of the center frequency, intensity, and/or increase in the width of the frequency could be potential indicators of leaks that can be detected using technique M1.

Figure 9:
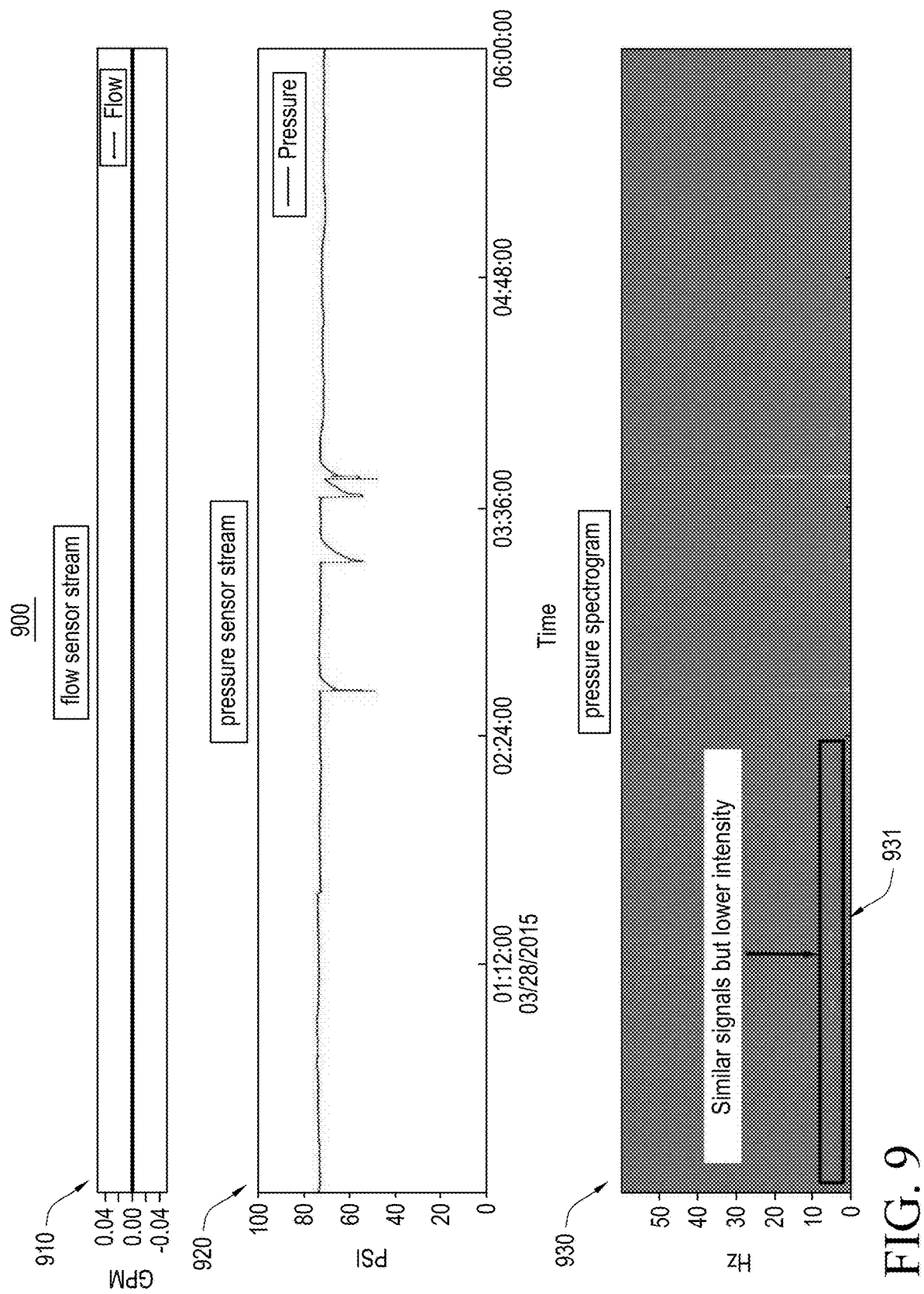
FIG. 9 illustrates graphs showing examples of pressure events corresponding to a baseline noise signature of a water system in a particular case.

Turning ahead in the drawings, FIG. 9 illustrates graphs 900 showing examples of pressure events corresponding to a baseline noise signature for a water system (e.g., 200 (FIG. 2)) in a particular case. Specifically, graphs 900 include a flow sensor stream 910 in a top graph, a pressure sensor stream 920 in a middle graph, and a pressure spectrogram 930 in a bottom graph. Pressure sensor stream 920 can be a raw pressure stream time domain signal as measured by pressure sensor 226 (FIG. 2). Pressure spectrogram 930 can be a frequency domain representation using a spectrogram, as transformed from pressure sensor stream 920. Flow sensor stream 910 can be a measure of flow through flow sensor 228 (FIG. 2). In many embodiments, pressure spectrogram 930 can include pressure events 931 detected during a low water activity time period (in this case, early morning hours) during the same month when leak detection device 224 (FIGS. 2, 5-6) was first installed. Each of pressure events 931 is a signal having a similar signature. Specifically, each of pressure events 931 is a low intensity event in an energy band centered at approximately 5 Hz. In many embodiments, pressure spectrogram 930 can represent a baseline frequency domain characteristic.

Figure 10:
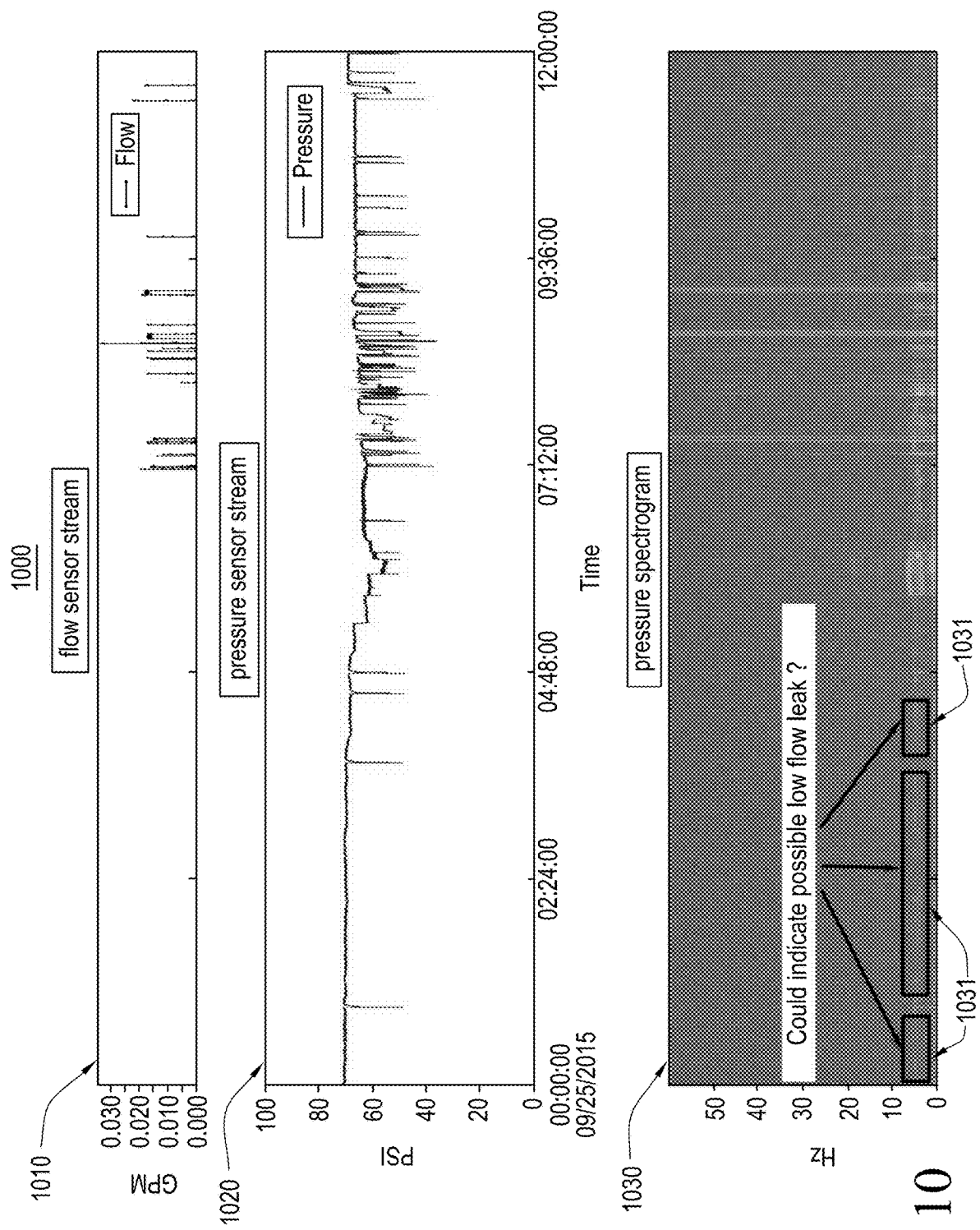
FIG. 10 illustrates graphs showing examples of pressure events corresponding to the water system analyzed in FIG. 9, as analyzed six months later.

Turning ahead in the drawings, FIG. 10 illustrates graphs 1000 showing examples of pressure events corresponding to the water system analyzed in FIG. 9, as analyzed six months later. Specifically, graphs 1000 include a flow sensor stream 1010 in a top graph, a pressure sensor stream 1020 in a middle graph, and a pressure spectrogram 1030 in a bottom graph. Pressure sensor stream 1020 can be a raw pressure stream time domain signal as measured by pressure sensor 226 (FIG. 2). Pressure spectrogram 1030 can be a frequency domain representation using a spectrogram, as transformed from pressure sensor stream 1020. Flow sensor stream 1010 can be a measure of flow through flow sensor 228 (FIG. 2). In many embodiments, pressure spectrogram 1030 can include pressure events 1031 during a low water activity time period (in this case, early morning hours) during a time period six months after the time period analyzed in FIG. 9. When comparing pressure events 1031 against the baseline, namely pressure events 931 (FIG. 9), it can be observed that pressure events 1031 are more pronounced signatures (of higher intensity) at the approximately 5 Hz energy band than pressure events 931 (FIG. 9). This change of intensity can be an indicator of a slow, persistent drip or small leak occurring in the water system (e.g., 200 (FIG. 2)).

Such a drip or small leak can occur due to a faulty washer at a fixture, or a fixture that has not been turned off properly. The water consumption by this type of leak is small compared to other leak types. These leaks can occur due to normal wear and tear of the fixtures over years of usage and can be relatively inexpensive to fix. It can be possible to detect these leaks as increased turbulence in certain frequency bands. Such leaks generally occur on the cold water lines (e.g., 232 (FIG. 2)), and the behavior of pressure events corresponding to such leaks can be independent of whether the system (e.g., water system 200 (FIG. 2)) exhibits high droop events or low droop pressure events. In many embodiments, long term monitoring of a water system (e.g., 200 (FIG. 2)) and generation of system model 536 (FIG. 5) can facilitate using technique M1 to analyze changes in frequency energy against a baseline, as shown in the differences between pressure events 931 (FIG. 9) and pressure events 1031. In some cases, back ground noise, such as shown in pressure events 931 (FIG. 9) and/or pressure events 1031 can be an indicator of a faulty pressure regulator. Such information can be used to provide users with information regarding the health of components in water system 200 (FIG. 2), such as pressure regulator 202 (FIGS. 2-3).

In some cases, appliances or other water fixtures can generate persistent turbulence (which may be in bands above 50 Hz). However, the frequency signatures of these appliances generally have a finite duration, which can be learned through user feedback and stored in a system model 536 (FIG. 5) of water system 200 (FIG. 2). For example, user feedback can include the user providing labels for events that occur. For example, cloud computing system 504 (FIG. 5) can detect that a pressure event has finished, and can direct graphical interface 506 (FIG. 5) to prompt the user for information about what pressure event was just completed, such as a clothes washer cycle. As another example, the user can provide information, such as the irrigation schedule for a water system (e.g., 200 (FIG. 2)). These pieces of information can be used to label pressure events internally and perform machine learning to more accurately detect pressure events. System model 536 (FIG. 5) can be referenced by leak detection device 224 (FIGS. 2, 5-6) and/or cloud computing system 504 (FIG. 5). Once learned, the appliance-generated frequency signals (or signatures) can be ignored as false positives during the leak detection process.

Figure 11:
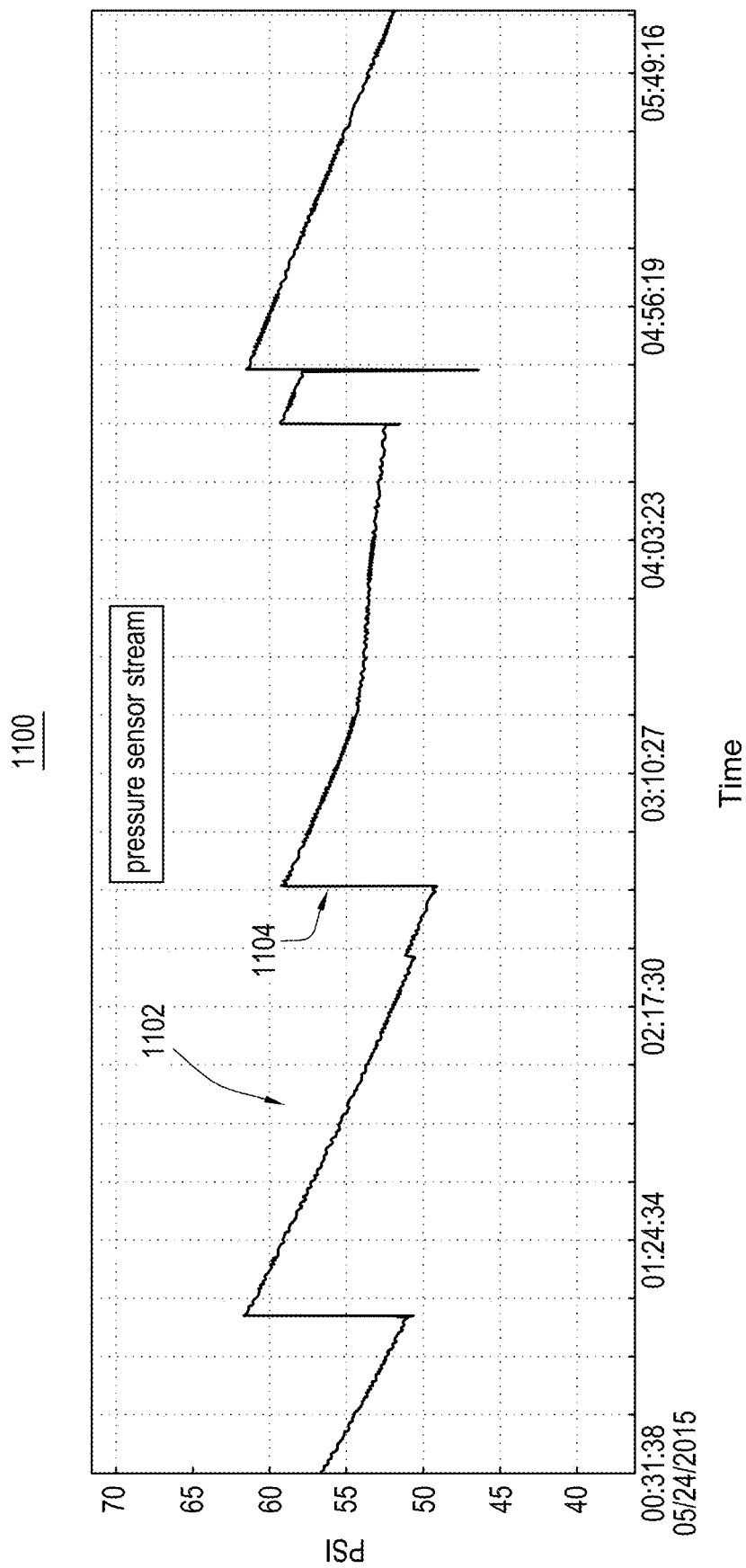
FIG. 11 illustrates a graph of a pressure sensor stream showing an example of pressure events detected using a second leak detection technique.

Turning ahead in the drawings, FIG. 11 illustrates a graph of a pressure sensor stream 1100 showing an example of pressure events detected using technique M2. Pressure sensor stream 1100 can be a raw pressure stream time domain signal as measured by pressure sensor 226 (FIG. 2). In many embodiments, leak detection technique M2 can monitor a pressure stream time domain signal in the time domain, such as pressure sensor stream 1100, to detect a non-cyclical pressure event from the pressure data over a period of time. The non-cyclical pressure event detected by technique M2 can include negative slopes, such as negative slope 1102, of pressure samples of pressure sensor stream 1100 with interruptions by a pressure increase, such as pressure reset boost 1104. For example, technique M2 can track the slope of successive pressure samples in pressure sensor stream 1100 in periods of non-event data, such as when no intentional water use events are occurring. If there is a consistent trend of monotonically decreasing samples, with a persistent negative slope, a leak can be determined to be present in water system 200 (FIG. 2). The persistent negative slope is non-cyclical because the flow of water never stops due to the leak. This type of event is expected to occur in systems (e.g., water system 200 (FIG. 2)) with high pressure droop, but in some cases will occur in systems with low pressure droop. Technique M2 can detect leaks of the nature shown in FIG. 11 regardless of whether the leak is on cold water lines 232 (FIG. 2) or hot water lines 234 (FIG. 2), and can be detected whether or not a tank-type water heather (e.g., water heater 204 (FIG. 2)) or tankless water heater is used.

The monotonic downward pressure trend is generally interrupted periodically by a pressure rise due to the pressure regulator (e.g., 202 (FIGS. 2-3)) activating to restore the downstream pressure to the set point pressure. As shown by the pressure sensor stream 1100 in FIG. 11, the result is a perpetual downtrend in pressure (e.g., negative slope 1102) with periodic pressure reset boosts (e.g., pressure reset boost 1104) triggered by pressure regulator activations. The data capture represented in FIG. 9 is during a period when no intentional water-use events are occurring. As a result, the pressure drops are due to the loss of water from the leak while pressure boosts are due to periodic attempts by the pressure regulator (e.g., 202 (FIG. 2)) to allow water from the utility into the home in order to restore the desired set point pressure. The timing of the negative slope and the interruptions can vary, and depends on the pressure regulator set point and the pressure regulator factors described above that affect the different styles of pressure signals that occur within a water system (e.g., 200 (FIG. 2)) when water is used.

Other causes of leaks and/or environmental interruptions of the leaks can occur. For example, a leak can occur in a pipe feeding an irrigation system. As described briefly above, after a prolonged period of leakage, a temporary seal can be created around the leak from the external pressure of the escaped water, causing an interruption of the leak. The leak can then re-opened once sufficient water is dissipated into the surrounding soil or evaporates. In another example, a leak occurring in an elevated fixture may be interrupted. For example, a leak can occur in a fixture on the second floor of a residence. The pressure in the pressurized water system of the residence will drop as water escapes from the leak. At some point, the decreased water pressure may become insufficient (when working against gravity) to continue to push water out of the elevated fixture, causing an interruption in the leak. The pressure regulator may then replenish the pressure to a point that the leak continues. These types of leaks with environmental interruptions may be detected using leak detection technique M2.

Figure 12:
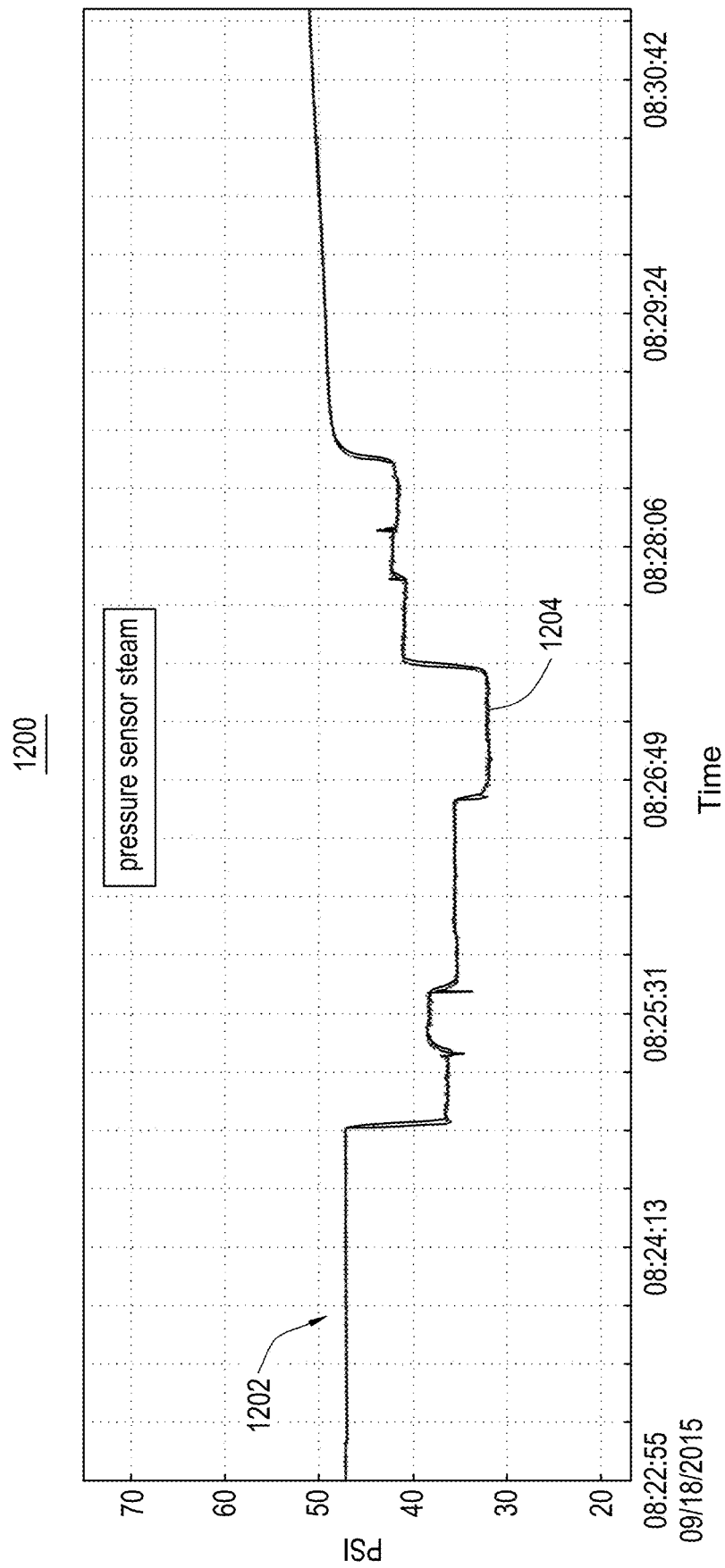
FIG. 12 illustrates a graph of an example pressure sensor stream having pressure events detected using a third leak detection technique.

FIG. 12 illustrates a graph of an example pressure sensor stream 1200 having pressure events detected using leak detection technique M3. Leak detection technique M3 can monitor a pressure stream time domain signal in the time domain of pressure sensor stream 1200 and can detect a non-cyclical pressure event from the pressure data over a period of time. The non-cyclical pressure event detected by technique M3 can involve the pressure level falling below a pressure level threshold (or pressure floor) over a period of time. The pressure level threshold can represents a pressure level floor observed during normal operating conditions of the pressurized system. For example, technique M3 can monitor the pressure sensor stream 1200 in the time domain for prolonged periods of significantly reduced water pressure relative to a historically established pressure set point range observed during normal conditions. Such a large drop in pressure can be attributed to a pipe burst or other form of catastrophic leak that results in a massive amount of water flowing out of the pressurized system. It is noted that FIG. 12 does not show a pressure level being below the pressure level threshold. Rather, pressure sensor stream 1200 shows a set point pressure level 1202 and a pressure level threshold 1204 that is a result of multiple high flow fixtures activated in parallel. Pressure level threshold 1204 shown in FIG. 12 is at approximately 31.62 PSI, and set point pressure level 1202 is approximately 47.18 PSI, indicating that pressure level threshold 1204 is a drop of approximately 15-16 PSI below set point pressure level 1202. One of ordinary skill in the art will appreciate that other pressure levels thresholds can be observed as the lowest pressure levels detected during intentional water-use events.

In some examples, pressure level threshold 1204, representing the lowest observed pressure based on intentional water-use events, can be the result of several simultaneous intentional water uses occurring in parallel in water system 200 (FIG. 2), as shown in FIG. 10. For example, the pressure level threshold 1204 can be set by causing various simultaneous intentional water-use events to occur, including a shower running in one bathroom, a tub running in another bathroom, an external spigot running, a sink running, and a toilet being flushed. In some embodiments, the pressure floor of pressure level threshold 1204 can be dynamically set as new pressure floors are observed during normal operation of the water fixtures in the pressurized system based on intentional water usage. In some embodiments, the new pressure floor can be set if it persists for more than a time threshold, such as approximately 1 minute, 2 minutes, 3 minutes, 5 minutes, or 10 minutes. A pressure signal that drops below pressure level threshold 1204 can be considered a leak and may trigger a notification to cloud computing system 504 (FIG. 5) and/or the user device for notifying a user quickly to facilitate mitigating property damage. In some embodiments, technique M3 can trigger a notification if the pressure signal stays below pressure level threshold 1204 for a time threshold. For example, the time threshold can be approximately 1 minute, 5 minutes, 10 minutes, 20 minutes, 30 minutes, 45 minutes, 1 hour, 1.5 hours, 2 hours, 2.5 hours, 3 hours, or 4 hours. In some embodiments, the time threshold can be similar or identical to the temporal threshold described above.

In some embodiments, it may be possible to determine when a drop below pressure level threshold 1204 is due to legitimate intentional water-use events. For example, pressure signatures of fixtures or appliances that are learned, as described above, can be used to determine that a large pressure drop is due to simultaneous use of a large number of fixtures or appliances that cause the drop below pressure level threshold 1204. In such cases, a drop in pressure below pressure level threshold 1204 can be disregarded.

In some cases, only drops below pressure level threshold 1204 that are not produced by the fixture where pressure sensor 226 (FIG. 2) is installed (e.g., kitchen faucet 206 (FIG. 2), or another location in which pressure sensor 226 (FIG. 2) is installed) are considered valid for dropping below pressure level threshold 1204. This fixture where pressure sensor 226 (FIG. 2) is located may be referred to as the installation-location fixture. As described briefly above and shown in FIGS. 4A and 4B, water usage at the installation-location fixture that is proximate to the location of pressure sensor 226 (FIG. 2) will likely have a high pressure drop due to the proximity of the installation-location fixture to pressure sensor 226 (FIG. 2) and the flow of water through the fixture. In such cases, flow sensor 228 (FIG. 2) can be used to determine when a pressure drop occurring at the location of pressure sensor 226 (FIG. 2) is due to an intentional water-use event. For example, events at the installation-location fixture can be distinguished by the presence of rotation recorded by the flow sensor turbine (or rotor) installed in series with pressure sensor 226 (FIG. 2) in leak detection device 224 (FIG. 2). If flow sensor 228 (FIG. 2) senses that flow is occurring in the water supply line at the installation-location fixture, then a pressure drop below the pressure floor can be disregarded. In some cases, a leak notification may be triggered earlier if a lowest observed pressure floor at the installation-location fixture, which can be lower than pressure level threshold 1204, is surpassed by a new lower pressure floor.

In many embodiments, leak detection technique M4 can detect leaks by monitoring a pressure stream time domain signal detected by pressure sensor 226 (FIG. 2) in the time domain and detecting a non-cyclical pressure event from the pressure data over a period of time. The non-cyclical pressure event detected by technique M4 can include variations in stable pressure levels. For example, technique M4 can track stable pressure over a period of time, such by computing a rounded mode of pressure measurements over a period of time, such as the previous 2 hours. In many embodiments, the pressure values can be rounded to one digit after the decimal, such that 73.2416 PSI is rounded to 73.2 PSI. The most frequently occurring value can be returned as the stable pressure. A standard deviation of the stable pressure can be computed using the rounded pressure values. If the standard deviation is greater than a standard deviation of a baseline calibrated stable pressure values by a multiple of a threshold N, technique M4 can determine that a leak has occurred that is causing incessant fluctuations in the stable pressure. In some embodiments, threshold N can be approximately 2, 2.5, 3, 3.5, 4, 4.5, 5, or another suitable value. In other embodiments, technique M4 can use a standard deviation of cloud stable pressure values calculated by cloud computing system 504 (FIG. 5) during 24 hour cycles for comparison instead of the standard deviation of the baseline calibrated stable pressure values.

In some cases, the variation in stable pressure levels from a normal range can be due to a change in the pressure regulator (e.g., 202 (FIGS. 2-3)) or a change in the properties of the pressure regulator, such as the loading force of loading element 302 (FIG. 3), a surface area of diaphragm 304 (FIG. 3), a size of orifice 312 (FIG. 3) around restricting element 310 (FIG. 3), or another suitable property. In some examples, leak detection device 224 (FIGS. 2, 5-6) or cloud computing system 504 (FIG. 5) can cause the water supply to be shut off, such as by sending a wireless signal to a network-connected shutoff valve that causes the shutoff valve to turn off the water supply. In some examples, leak detection device 224 (FIGS. 2, 5-6) or cloud computing system 504 (FIG. 5) can send a notification to a user device of a user (e.g., through graphical interface 506 (FIG. 5) of a mobile application or a web interface, for example). The user can temporarily turn off the water supply from the utility at a main inlet valve, and can send a notification (e.g., using any suitable messaging or email service, or a push notification triggered) from the user device (e.g., graphical interface 506 (FIG. 5) of a mobile application or a web interface) to leak detection device 224 (FIGS. 2, 5-6) or cloud computing system 504 (FIG. 5) alerting leak detection system 500. When the shutoff occurs using any of these examples, the water pressure will either stabilize and remain constant (in which case the fluctuations are attributable to variations in the utility pressure and the pressure regulator), or the pressure will gradually diminish without a source to replenish it, in which case a leak is determined to exist by leak detection technique M4.

Returning to FIG. 5, one or more of the various different leak detection techniques M1-M4 can be used independently to detect leaks. Once a leak has been detected by leak detection device 224 using any of the techniques M1-M4, leak detection device 224 or cloud computing system 504 can send a notification to a user device of a user running graphical interface 506.

The leak detection techniques M1-M4 can run in firmware 515 of leak detection device 224. In some embodiments, when leak detection device 224 detects a potential leak using one or more of the techniques M1-M4, leak detection device 224 can trigger a request for further verification to cloud computing system 504, such as leak validation components 530. For example, when firmware 515 detects a characteristic (in the time or frequency domain) indicating leak-like behavior using one or more of techniques M1-M4, firmware 515 can trigger a request for further verification by cloud computing system 504, which can be not bound by the memory constraints of leak detection device 224, and thus can be able to consider longer segments of data, such as data in long-term storage 527, when verifying the presence or absence of a leak. For example, long-term storage 527 can store large amounts of data so that cloud computing system 504 can look at pressure data further back in time than the pressure data available in short-term data access 518 of leak detection device 224. Based on the larger amount of data, the cloud analytics engine can do significantly more sophisticated analysis to verify leaks detected by leak detection device 224, as described below in further detail.

Once a leak is detected, leak detection device 224 and/or cloud computing system 504 can provide information to the graphical interface 506. Graphical interface 506 can be implemented as a mobile application interface or a web interface on the user device. Graphical interface 506 can provide notification and interaction functions for a user of the user device. For example, graphical interface 506 can communicate or present leak information to the user. Leak detection device 224 and/or cloud computing system 504 can send leak notifications to graphical interface 506 when a leak is detected. The leak notification can be displayed to the user on a display of the user device so the user can fix the leak. In some embodiments, graphical interface 506 can allow the user to provide input to enable and disable various fixtures in water system 200 (FIG. 2). For example, the user can remotely configure or control fixtures that are controllable using the detection device 224. In some embodiments, graphical interface 506 can allow the user to enable or disable various settings, such as the types of notifications that are received, the frequency at which notifications are received, types of leaks to report to the user device, or any other suitable setting.

In some embodiments, when the processing power of leak detection device 224 allows, leak detection device 224 can combine the outputs of two or more of the leak detection techniques M1-M4 to make a precise conclusion about the type of leak that has been detected. In many embodiments, cloud computing system 504 can combine the outputs of the techniques M1-M4 to determine a type of leak. For example, leak detection device 224 and/or cloud computing system 504 can detect different types of leaks based on one or more of leak detection techniques M1-M4 identifying the frequency domain or time domain characteristics from the pressure data, as described above. Examples of leak types that can be identified based on different combinations of the techniques M1-M4 being satisfied are shown below in Table 2. Leak detection device 224 and/or cloud computing system 504 can map one or more detected time and/or frequency domain characteristics to a type of leak, as explained below in further detail.

TABLE 2

| Leak Type | GPM Lower Bound | High Pressure Droop Home | | Low Pressure Droop Home | |
|---|---|---|---|---|---|
| | | Leak on Hot Line | Leak on Cold Line | Leak on Hot Line | Leak on Cold Line |
| Miniscule (Drip/Bleed/Seep/Ooze) | 0.01 | M2 (if detectable) | M1, M2 (if detectable) | M4 (if detectable) | M1 (if detectable) |
| Small | 0.25 | M2 | M1, M2 | M4 (if detectable) | M1 |
| Medium | 1 | M2 | M1, M2 | M4 | M1, M4 |
| Large/Catastrophic | 5 | M2, M3 | M1, M2, M3 | M3 | M1, M3 |

Different types of leaks can include a miniscule leak that releases approximately 0.01-0.25 GPM, a small leak that releases approximately 0.25-1.0 GPM, a medium that releases approximately 1-5 GPM, and a large or catastrophic leak that releases approximately 5 GPM or greater. The different types of leaks can be detected based on one or more of, or various different combinations of, techniques M1-M4 being satisfied. The combinations for the miniscule, small, and medium leak types are similar. In some cases, the miniscule leaks are not detectable in the event a pressure frequency characteristic, slope, or standard deviation is not discernable from the time domain or frequency domain characteristics described above.

In some embodiments, when leak detection system 224 sends a leak notification to cloud detection system 504, which can indicate a potential leak, cloud detection system 504 can perform preliminary checks of the data to determine whether the leak notification is occurring during known irrigation times, or if the leak has a signature that closely matches previously dismissed leak notifications, such as a previous leak notification that the user has dismissed as not being leaks, and cloud detection system 504 can use such preliminary checks to disregard some of the leak notifications.

In various embodiments, ensemble voting component 532 can analyze the results of independent method verification component 531 applying techniques M1-M4. In many embodiments, if any of techniques M1-M4 analyzed by independent method verification component 531 results in a Threshold 1 confidence level (approximately 80% of higher confidence level, as described above), a user leak notification can be triggered to notify the user. In a number of embodiments, cloud computing system 504 can perform an additional monitoring procedure using additional new data, as described below, to further characterize the leak.

In several embodiments, if none of techniques M1-M4 return a Threshold 1 confidence level, but one or more techniques return a Threshold 2 confidence level (approximately 60% to 80% confidence level, as described above), cloud computing system 504 can perform an additional monitoring procedure using additional new data, as described below, to determine if any one of the outputs of techniques M1-M4 reaches a Threshold 1 confidence level or if two or more of the outputs of techniques M1-M4 sustain the Threshold 2 confidence levels over an extended monitoring period, as described below. If either or both of these conditions are met, a user leak notification can be triggered to notify the user.

In a number of embodiments, the additional monitoring procedure using additional data can search backward in the data over a time period before the time period analyzed for the notification alert is received by cloud computing device 504 and/or analyze incoming data after the notification alert is received by cloud computing device 504. For example, in some embodiments, the amount of additional time analyzed in searching backwards and/or analyzing forward can be a multiple (e.g., 1, 2, 3, 4, 5) of the temporal threshold, as defined above. For example, if the temporal threshold is 45 minutes, and the multiple is 3, the additional monitoring procedure can search back over the previous 135 minutes of data and analyze the following 135 minutes of incoming data. During this analysis, the procedure can check Threshold 1 confidence levels being reached using the same or other techniques as the one or more techniques that resulted in the notification alert.

In some embodiments, depending on the techniques and the confidence levels returned output, cloud computing system 504 can accurately determine the size of the detected leak, such as in which leak type category of Table 2 the detected leak should be categorized. In a number of embodiments, if only one technique triggers a Threshold 1 confidence level or if multiple methods trigger a Threshold 2 confidence level, it can be possible to rule out certain leak types but nonetheless be unable to make a conclusive determination regarding which one of the leak type categories applies.

Although the above-described examples are described with reference to water leaks, the leak detection system 500 can use the same techniques M1-M4 to monitor pressure characteristics of other pressurized systems to detect leaks, such as in natural gas or another pressurized substance.

Figure 13:
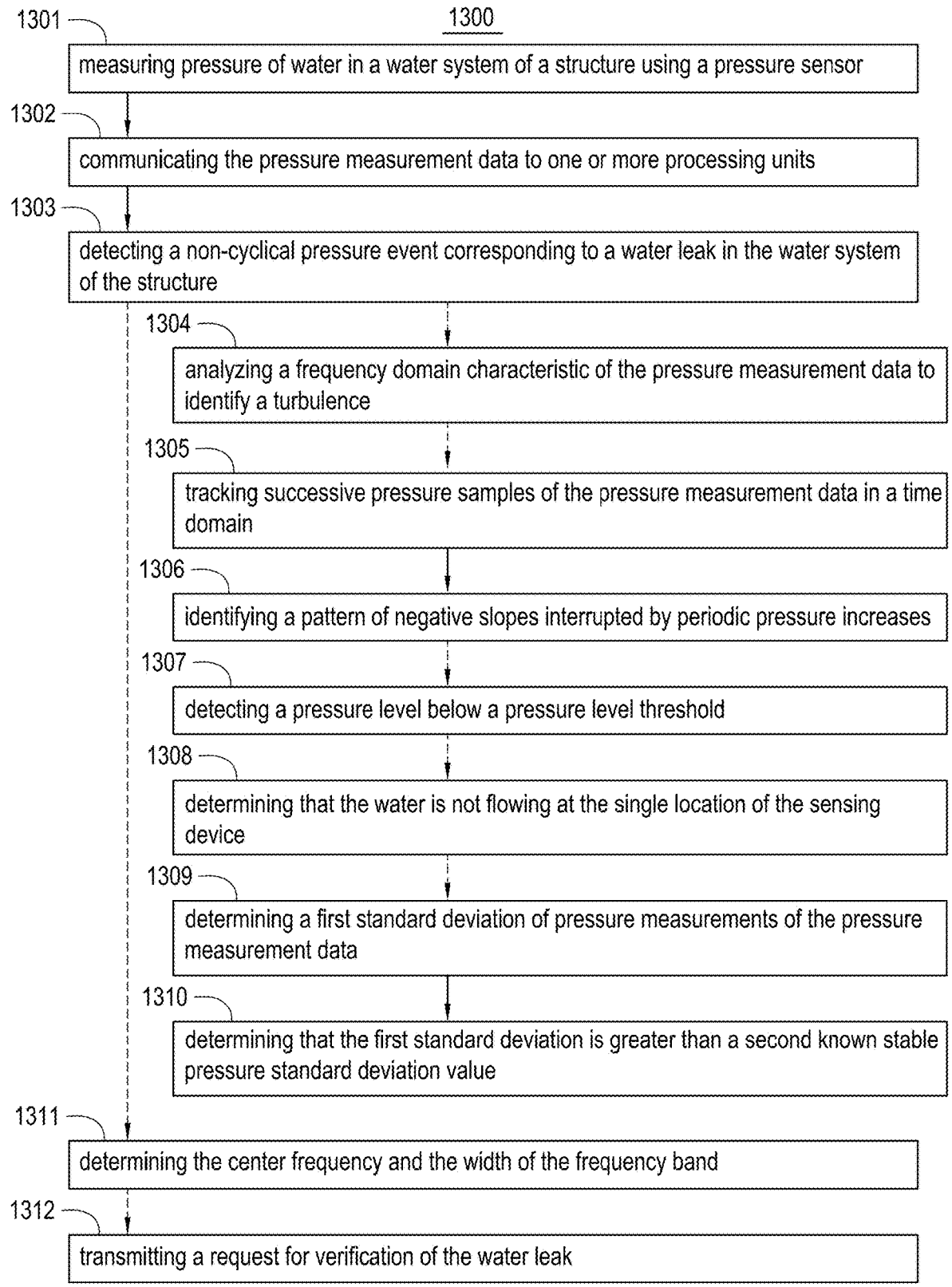
FIG. 13 illustrates a flow chart for a method 1300, according to an embodiment.

Turning ahead in the drawings, FIG. 13 illustrates a flow chart for a method 1300, according to an embodiment. In some embodiments, method 1300 can be a method of leak detection, such as water leak detection. Method 1300 is merely exemplary and is not limited to the embodiments presented herein. Method 1300 can be employed in many different embodiments or examples not specifically depicted or described herein. In some embodiments, the procedures, the processes, and/or the activities of method 1300 can be performed in the order presented. In other embodiments, the procedures, the processes, and/or the activities of method 1300 can be performed in any suitable order. In still other embodiments, one or more of the procedures, the processes, and/or the activities of method 1300 can be combined or skipped.

Referring to FIG. 13, in some embodiments, method 1300 can include a block 1301 of measuring pressure of water in a water system of a structure at a single location in the water system using a pressure sensor of a sensing device to generate pressure measurement data representing the pressure of the water as measured by the pressure sensor. In a number of embodiments, the water system can be similar or identical to water system 200 (FIG. 2). In several embodiments, the sensing device can be similar or identical to leak detection device 224 (FIGS. 2, 5-6). In a number of embodiments, the pressure sensor can be similar or identical to pressure sensor 226 (FIG. 2). In a number of embodiments, the pressure measurement data can be a pressure signal, such as a sampled digital pressure signal.

In many embodiments, the single location can be similar or identical to the installation of leak detection device 224 (FIGS. 2, 5-6) at kitchen sink faucet 604 (FIG. 6), or at another suitable single location of the water system. In some embodiments, the single location of the sensing device can be located between a pressure regulator of the water system and a first fixture of the water system. The pressure regulator can be similar or identical to pressure regulator 202 (FIGS. 2-3). The first fixture can be similar to kitchen sink faucet 604, or another suitable single location.

In a number of embodiments, method 1300 additionally can include a block 1302 of communicating the pressure measurement data to one or more processing units. In some embodiments, the one or more processing units can be part of leak detection device 224 (FIGS. 2, 5-6) and/or cloud computing system 504 (FIG. 5). In some embodiments, when the pressure measurement data is communicated from leak detection device 224 (FIGS. 2, 5-6) to cloud computing system 504 (FIG. 5), the pressure measurement data can be streamed, such as through radio components 511 (FIG. 5) and/or streaming gateway 526 (FIG. 5).

In a number of embodiments, method 1300 additionally can include a block 1303 of detecting a non-cyclical pressure event corresponding to a water leak in the water system of the structure during a first time period based on an analysis of information comprising the pressure measurement data. In some embodiments, the non-cyclical pressure event can be similar or identical to leak turbulence signal 702 (FIG. 7), pressure events 1031 (FIG. 10), the non-cyclical pressure event depicted in pressure sensor stream 1100 (FIG. 11) (including negative slope 1102 (FIG. 11) and pressure reset boost 1104 (FIG. 11)), the non-cyclical pressure event described above in conjunction with FIG. 12, and/or other suitable non-cyclical pressure events. In many embodiments, the first time period can be a time period over which the leak is detected. In some embodiments, the first time period can be the temporal threshold described above, and/or the other time thresholds described above. In other embodiments, the first time period can include time during which detection is being performed or in which data is being gathered for leak detection, but in a number of embodiments can exclude time periods used for calibration or baseline generation of the sensing device.

In some embodiments, the information analyzed in the analysis can include the pressure measurement data in a time domain, and/or a frequency domain characteristic of the pressure measurement data. For example, the pressure measurement data in a time domain can be similar to pressure sensor stream 401 (FIG. 4A), pressure sensor stream 451 (FIG. 4B), pressure sensor stream 704 (FIG. 7), pressure sensor stream 820 (FIG. 8), pressure sensor stream 920 (FIG. 9), pressure sensor stream 1020 (FIG. 10), pressure sensor stream 1100 (FIG. 11), and/or pressure sensor stream 1200 (FIG. 12). The frequency domain characteristic can be similar or identical to pressure spectrogram 420 (FIG. 4A), pressure spectrogram 470 (FIG. 4B), pressure spectrogram 720 (FIG. 7), pressure spectrogram 830 (FIG. 8), pressure spectrogram 930 (FIG. 9), pressure spectrogram 1030 (FIG. 10), pressure sensor stream 1100 (FIG. 11), and/or pressure sensor stream 1200 (FIG. 12).

In a number of embodiments, the information analyzed in the analysis does not include any flow measurement data that represents an amount of flow of the water in the water system of the structure during the first time period. In some embodiments, flow measurement data from flow sensor 228 (FIG. 2) at the single location (e.g., at kitchen sink faucet 604 (FIG. 6)) can be included in the information used in the analysis, but not flow measurement data of the total flow in the system, such as the amount of flow through pressure regulator 202 (FIGS. 2-3) or a flow meter provided by the utility (e.g., an automatic meter reading (AMR) device). In other embodiments, no flow measurement data can be included in the information that is used in the analysis. In some embodiments, flow turbine information regarding whether the water is flowing at flow sensor 228 (FIG. 2) can be included in the information without providing flow measurement data.

In several embodiments, block 1303 of detecting the non-cyclical pressure event optionally can include a block 1304 of analyzing a frequency domain characteristic of the pressure measurement data to identify a turbulence in the frequency domain characteristic when compared to a baseline frequency domain characteristic. For example, the baseline frequency domain characteristic can be similar to pressure spectrogram 930 (FIG. 9). In some embodiments, the turbulence can have a duration longer than a first threshold. The first threshold can be the temporal threshold defined above, and/or the other time thresholds described above. In some embodiments, the first threshold can be 45 minutes.

In some embodiments, the turbulence can be similar or identical to leak turbulence signal 702 (FIG. 7) and/or pressure events 1031 (FIG. 10). In a number of embodiments, the turbulence can include a frequency band in the frequency domain characteristic. In many embodiments, the frequency band can have a center frequency and a width. In several embodiments, the center frequency and/or width can be detected by the sensing device. In a number of embodiments, block 1304 can implement an embodiment of technique M1.

In a number of embodiments, block 1303 of detecting the non-cyclical pressure event optionally can include a block 1305 of tracking successive pressure samples of the pressure measurement data in a time domain. For example, the tracking can be similar or identical to tracking of pressure samples in pressure sensor stream 1100 (FIG. 11), as described above in conjunction with FIG. 11.

In a number of embodiments, block 1303 of detecting the non-cyclical pressure event next can include after block 1305 a block 1306 of identifying a pattern of negative slopes interrupted by periodic pressure reset boosts. For example, the negative slopes can be similar or identical to negative slope 1102 (FIG. 11). The periodic pressure reset boosts can be similar or identical to pressure reset boost 1104 (FIG. 11). In several embodiments, the periodic pressure reset boosts can correspond to pressure resets activated by a pressure regulator coupled to the water system of the structure. The pressure regulator can be similar or identical to pressure regulator 202 (FIGS. 2-3). In a many embodiments, blocks 1305 and 1306 can implement an embodiment of technique M2.

In a number of embodiments, block 1303 of detecting the non-cyclical pressure event optionally can include a block 1307 of detecting a pressure level below a pressure level threshold. The pressure level threshold can be similar to pressure level threshold 1204 (FIG. 12). In many embodiments, the pressure level threshold can represent a pressure level floor observed during normal operating conditions of the water system.

In a number of embodiments, block 1303 of detecting the non-cyclical pressure event optionally can include after block 1307 a block of 1308 of determining that the water is not flowing at the single location of the sensing device when the pressure level is detected below the pressure level threshold. In some embodiments, the sensing device can include a flow turbine configured to determine whether the water is flowing at the single location of the sensing device. In some embodiments, the flow turbine can be similar or identical to flow sensor 228 (FIG. 2). In a many embodiments, blocks 1307 and/or 1308 can implement an embodiment of technique M3.

In a number of embodiments, block 1303 of detecting the non-cyclical pressure event optionally can include a block 1309 of determining a first standard deviation of pressure measurements of the pressure measurement data during a second time period including at least a portion of the first time period. In many embodiments, the second time period can be similar or identical to the period of time described above for tracking stable pressure for computing rounded mode of pressure measurements. For example, the second time period can be 2 hours wholly or at least partially within the first time period.

In a number of embodiments, block 1303 of detecting the non-cyclical pressure event next can include after block 1309 a block 1310 of determining that the first standard deviation is greater than a second known stable pressure standard deviation value by a multiple of a second threshold. In a number of embodiments, the second threshold can be similar or identical to threshold N described above. In some embodiments, the second threshold is 3.5. In a many embodiments, blocks 1309 and 1310 can implement an embodiment of technique M4.

In a number of embodiments, method 1300 further optionally can include a block 1311 of determining the center frequency and the width of the frequency band.

In several embodiments, method 1300 further optionally can include a block 1312 of transmitting a request for verification of the water leak. For example, the request for verification can be sent from the sensing device to a cloud computing system, such as cloud computing system 504 (FIG. 5).

Figure 14:
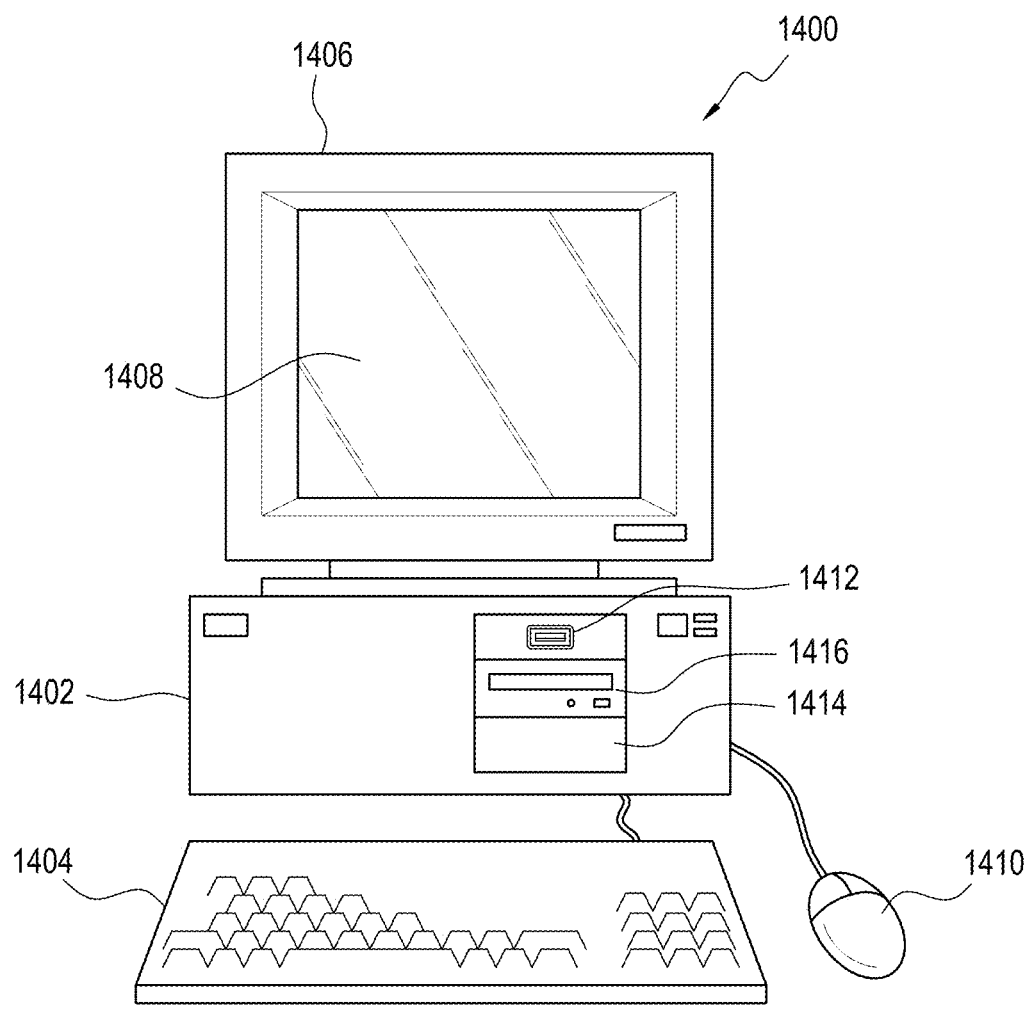
FIG. 14 illustrates a computer system, according to an embodiment.
Figure 15:
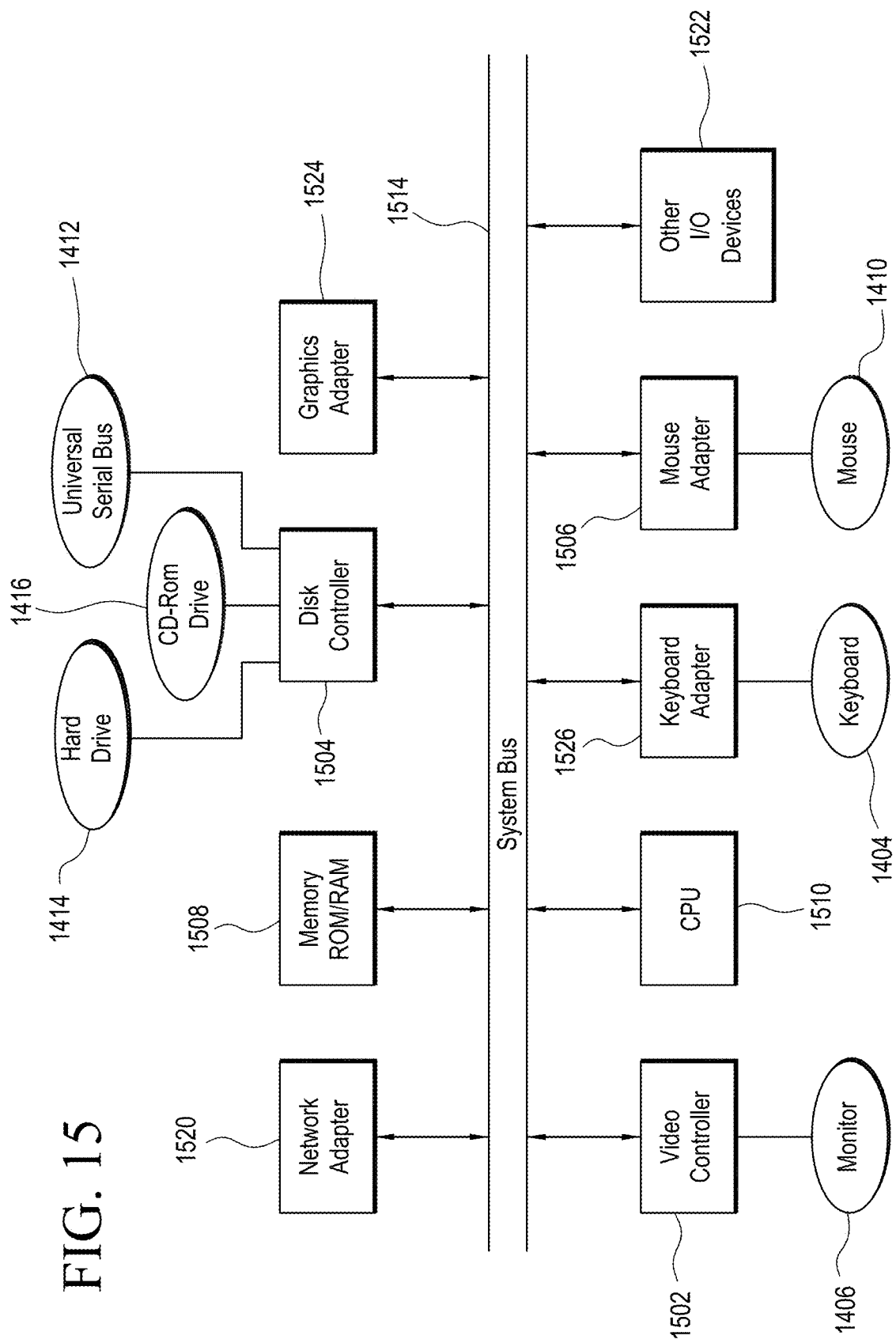
FIG. 15 illustrates a representative block diagram of an example of elements included in circuit boards inside a chassis of the computer of FIG. 14.

Turning ahead in the drawings, FIG. 14 illustrates a computer system 1400, all of which or a portion of which can be suitable for implementing an embodiment of at least a portion of network devices 102, 104, and 106, access device 108, leak detection device 224 (FIGS. 2, 5-6), cloud computing system 504, and/or the user device (e.g., access device 108) providing graphical interface 506 (FIG. 5), and/or the techniques (e.g., M1-M4) described above, and/or method 1300 (FIG. 13). Computer system 1400 includes a chassis 1402 containing one or more circuit boards (not shown), a USB (universal serial bus) port 1412, a Compact Disc Read-Only Memory (CD-ROM) and/or Digital Video Disc (DVD) drive 1416, and a hard drive 1414. A representative block diagram of the elements included on the circuit boards inside chassis 1402 is shown in FIG. 15. A central processing unit (CPU) 1510 in FIG. 15 is coupled to a system bus 1514 in FIG. 15. In various embodiments, the architecture of CPU 1510 can be compliant with any of a variety of commercially distributed architecture families.

Continuing with FIG. 15, system bus 1514 also is coupled to memory 1508 that includes both read only memory (ROM) and random access memory (RAM). Non-volatile portions of memory storage unit 1508 or the ROM can be encoded with a boot code sequence suitable for restoring computer system 1400 (FIG. 14) to a functional state after a system reset. In addition, memory 1508 can include microcode such as a Basic Input-Output System (BIOS). In some examples, the one or more memory storage units of the various embodiments disclosed herein can comprise memory storage unit 1508, a USB-equipped electronic device, such as, an external memory storage unit (not shown) coupled to universal serial bus (USB) port 1412 (FIGS. 14-15), hard drive 1414 (FIGS. 14-15), and/or CD-ROM or DVD drive 1416 (FIGS. 14-15). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1510.

In the depicted embodiment of FIG. 15, various I/O devices such as a disk controller 1504, a graphics adapter 1524, a video controller 1502, a keyboard adapter 1526, a mouse adapter 1506, a network adapter 1520, and other I/O devices 1522 can be coupled to system bus 1514. Keyboard adapter 1526 and mouse adapter 1506 are coupled to a keyboard 1404 (FIGS. 14 and 15) and a mouse 1410 (FIGS. 14 and 15), respectively, of computer system 1400 (FIG. 14). While graphics adapter 1524 and video controller 1502 are indicated as distinct units in FIG. 15, video controller 1502 can be integrated into graphics adapter 1524, or vice versa in other embodiments. Video controller 1502 is suitable for refreshing a monitor 1406 (FIGS. 14 and 15) to display images on a screen 1408 (FIG. 14) of computer system 1400 (FIG. 14). Disk controller 1504 can control hard drive 1414 (FIGS. 14 and 15), USB port 1412 (FIGS. 14 and 15), and CD-ROM or DVD drive 1416 (FIGS. 14 and 15). In other embodiments, distinct units can be used to control each of these devices separately.

In some embodiments, network adapter 1520 can comprise and/or be implemented as a WNIC (wireless network interface controller) card (not shown) plugged or coupled to an expansion port (not shown) in computer system 1400 (FIG. 14). In other embodiments, the WNIC card can be a wireless network card built into computer system 1400 (FIG. 14). A wireless network adapter can be built into computer system 1400 (FIG. 14) by having wireless communication capabilities integrated into the motherboard chipset (not shown), or implemented via one or more dedicated wireless communication chips (not shown), connected through a PCI (peripheral component interconnector) or a PCI express bus of computer system 1400 (FIG. 14) or USB port 1412 (FIG. 14). In other embodiments, network adapter 1520 can comprise and/or be implemented as a wired network interface controller card (not shown).

Although many other components of computer system 1400 (FIG. 14) are not shown, such components and their interconnection are well known to those of ordinary skill in the art. Accordingly, further details concerning the construction and composition of computer system 1400 (FIG. 14) and the circuit boards inside chassis 1402 (FIG. 14) need not be discussed herein.

When computer system 1400 in FIG. 14 is running, program instructions stored on a USB drive in USB port 1412, on a CD-ROM or DVD in CD-ROM and/or DVD drive 1416, on hard drive 1414, or in memory 1508 (FIG. 15) are executed by CPU 1510 (FIG. 15). A portion of the program instructions, stored on these devices, can be suitable for carrying out all or at least part of the techniques described herein. In various embodiments, computer system 1400 can be reprogrammed with one or more modules, applications, and/or databases, such as those described herein, to convert a general purpose computer to a special purpose computer.

Although computer system 1400 is illustrated as a desktop computer in FIG. 14, there can be examples where computer system 1400 may take a different form factor while still having functional elements similar to those described for computer system 1400. In some embodiments, computer system 1400 may comprise a single computer, a single server, or a cluster or collection of computers or servers, or a cloud of computers or servers. Typically, a cluster or collection of servers can be used when the demand on computer system 1400 exceeds the reasonable capability of a single server or computer. In certain embodiments, computer system 1400 may comprise a portable computer, such as a laptop computer. In certain other embodiments, computer system 1400 may comprise a mobile device, such as a smartphone. In certain additional embodiments, computer system 1400 may comprise an embedded system. For example, leak detection device 224 (FIGS. 2, 5-6) can include elements that are similar or identical to at least a portion of the elements of computer system 1400, such as to provide storage, processing, and/or communication computing capabilities.

Although the disclosure has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-15 may be modified, and that the foregoing discussion of certain of these embodiments does not necessarily represent a complete description of all possible embodiments. For example, one or more of the procedures, processes, or activities of FIG. 13 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
    measuring pressure of water in a water system of a structure using a single pressure sensor of a sensing device at a single location in the water system to generate pressure measurement data representing the pressure of the water as measured by the single pressure sensor;
    communicating the pressure measurement data to one or more processors; and
    detecting a non-cyclical pressure event corresponding to a water leak in the water system of the structure during a first time period based on an analysis of information comprising the pressure measurement data, wherein the information analyzed in the analysis does not include flow measurement data that represents a total amount of flow of the water in the water system of the structure during the first time period.

2. The method of claim 1, wherein:
    the information analyzed in the analysis further comprises: (a) the pressure measurement data in a time domain, and (b) a frequency domain characteristic of the pressure measurement data.

3. The method of claim 1, wherein detecting the non-cyclical pressure event further comprises:
    analyzing a frequency domain characteristic of the pressure measurement data to identify a turbulence in the frequency domain characteristic when compared to a baseline frequency domain characteristic of the pressure measurement data, wherein the turbulence has a duration longer than a first threshold.

4. The method of claim 3, wherein:
    the first threshold is 45 minutes.

5. The method of claim 3, wherein:
    the turbulence comprises a frequency band in the frequency domain characteristic; and
    the frequency band has a center frequency and a width.

6. The method of claim 5 further comprising:
    determining the center frequency and the width of the frequency band.

7. The method of claim 1, wherein detecting the non-cyclical pressure event further comprises:
    tracking successive pressure samples of the pressure measurement data in a time domain.

8. The method of claim 7, wherein detecting the non-cyclical pressure event further comprises:
    identifying, using the successive pressure samples, a pattern of negative slopes interrupted by periodic pressure increases.

9. The method of claim 8, wherein:
    the periodic pressure increases correspond to pressure resets activated by a pressure regulator coupled to the water system of the structure.

10. The method of claim 1, wherein detecting the non-cyclical pressure event further comprises:
    detecting a pressure level below a pressure level threshold.

11. The method of claim 10, wherein:
    the pressure level threshold represents a pressure level floor observed during normal operating conditions of the water system.

12. The method of claim 11, wherein:
    the sensing device further comprises a flow turbine configured to determine whether the water is flowing at the single location of the single pressure sensor of the sensing device.

13. The method of claim 12, wherein detecting the non-cyclical pressure event further comprises:
    determining that the water is not flowing at the single location of the single pressure sensor of the sensing device while the pressure level is detected below the pressure level threshold.

14. The method of claim 1, wherein detecting the non-cyclical pressure event further comprises:
    determining a first standard deviation of pressure measurements of the pressure measurement data during a second time period comprising at least a portion of the first time period.

15. The method of claim 14, wherein detecting the non-cyclical pressure event further comprises:
    determining that the first standard deviation is greater than a second known stable pressure standard deviation value by a multiple of a second threshold.

16. The method of claim 15, wherein:
    the second threshold is 3.5.

17. The method of claim 1, wherein:
    the single location of the single pressure sensor of the sensing device is located between a pressure regulator of the water system and a first fixture of the water system.

18. The method of claim 1 further comprising:
    transmitting a request for verification of the water leak.

19. The method of claim 1, wherein:
    the information analyzed in the analysis further comprises: (a) the pressure measurement data in a time domain, and (b) a frequency domain characteristic of the pressure measurement data; and
    the single location of the single pressure sensor of the sensing device is located between a pressure regulator of the water system and a first fixture of the water system.

20. The method of claim 1 further comprising:
    transmitting a request for verification of the water leak, wherein:

the single location of the single pressure sensor of the sensing device is located between a pressure regulator of the water system and a first fixture of the water system.

* * * * *